United States Patent
Tong et al.

(10) Patent No.: US 10,834,221 B2
(45) Date of Patent: Nov. 10, 2020

(54) METHOD AND SYSTEM FOR PROVIDING PREDICTIONS VIA ARTIFICIAL INTELLIGENCE (AI) MODELS USING A DISTRIBUTED SYSTEM

(71) Applicant: Xevo Inc., Bellevue, WA (US)

(72) Inventors: Richard Chia Tsing Tong, Seattle, WA (US); Robert Victor Welland, Seattle, WA (US); John Hayes Ludwig, Bellevue, WA (US); John Palmer Cordell, Los Angeles, CA (US); Samuel James McKelvie, Seattle, WA (US)

(73) Assignee: XEVO INC., Bellevue, WA (US)

( * ) Notice: Subject to any disclaimer, the term of this patent is extended or adjusted under 35 U.S.C. 154(b) by 218 days.

(21) Appl. No.: 15/941,540

(22) Filed: Mar. 30, 2018

(65) Prior Publication Data
US 2018/0288182 A1    Oct. 4, 2018

Related U.S. Application Data

(60) Provisional application No. 62/479,229, filed on Mar. 30, 2017.

(51) Int. Cl.
*H04L 29/08* (2006.01)
*H04N 7/18* (2006.01)
(Continued)

(52) U.S. Cl.
CPC ............ *H04L 67/2828* (2013.01); *B60R 1/00* (2013.01); *G06F 16/24568* (2019.01);
(Continued)

(58) Field of Classification Search
CPC . B60R 1/00; G06F 16/24568; G06F 16/5854; G06F 16/7834; G06K 9/00845; H04L 67/2828; H04N 7/181; H04N 7/188
See application file for complete search history.

(56) References Cited

U.S. PATENT DOCUMENTS

| | | | |
|---|---|---|---|
| 9,227,568 B1 * | 1/2016 | Hubbell | B60R 1/081 |
| 2015/0032331 A1 | 1/2015 | El Dokor et al. | |

(Continued)

FOREIGN PATENT DOCUMENTS

JP    2016/529151 A    9/2016

*Primary Examiner* — Mohammed S Rahaman
(74) *Attorney, Agent, or Firm* — Seed IP Law Group LLP

(57) ABSTRACT

One embodiment discloses an automobile having multiple distributed subsystems configured to provide communication via a network system. The automobile includes an outward facing camera ("OFC") subsystem and a vehicle onboard computer ("VOC"). The OFC subsystem, having at least one OFC, OFC processor, and OFC database, is configured to recognize a predefined exterior object from a set of exterior images captured by the OFC based on an OFC query. The VOC includes a VOC central processing unit, VOC database, and network manager, wherein the network manager includes an internal network circuit and an external network circuit. The internal network circuit is used for communicating with the OFC subsystem while the external network circuit is used to interface with a cloud system. In one aspect, the VOC provides a data stream representing a recognized event in accordance with a query retrieved from the VOC database.

18 Claims, 18 Drawing Sheets

(51) Int. Cl.
*G06K 9/00* (2006.01)
*G06F 16/583* (2019.01)
*G06F 16/783* (2019.01)
*G06F 16/2455* (2019.01)
*B60R 1/00* (2006.01)

(52) U.S. Cl.
CPC ...... *G06F 16/5854* (2019.01); *G06F 16/7834* (2019.01); *G06K 9/00845* (2013.01); *H04N 7/181* (2013.01); *H04N 7/188* (2013.01)

(56) References Cited

U.S. PATENT DOCUMENTS

| | | | |
|---|---|---|---|
| 2015/0035665 A1* | 2/2015 | Plante | G07C 5/085 |
| | | | 340/438 |
| 2015/0112543 A1* | 4/2015 | Binion | G06Q 40/08 |
| | | | 701/32.2 |
| 2015/0150124 A1 | 5/2015 | Zhang et al. | |
| 2015/0193885 A1* | 7/2015 | Akiva | G06Q 40/08 |
| | | | 705/4 |
| 2016/0086391 A1* | 3/2016 | Ricci | G07C 5/008 |
| | | | 701/29.3 |
| 2016/0221573 A1* | 8/2016 | Prokhorov | B60W 30/08 |
| 2016/0355125 A1* | 12/2016 | Herbert | B60K 35/00 |
| 2017/0078400 A1 | 3/2017 | Binder et al. | |
| 2018/0127001 A1* | 5/2018 | Ricci | B60R 25/2018 |

* cited by examiner

METHOD AND SYSTEM FOR PROVIDING PREDICTIONS VIA ARTIFICIAL INTELLIGENCE (AI) MODELS USING A DISTRIBUTED SYSTEM

PRIORITY

This application claims the benefit of priority based upon U.S. Provisional Patent Application having an application Ser. No. 62/479,229, filed on Mar. 30, 2017, and having a title of "Method and System for Providing Artificial Intelligence (AI) via Big Data," which is hereby incorporated by reference in its entirety.

FIELD

The exemplary embodiment(s) relates to the field of communication networks. More specifically, the exemplary embodiment(s) relates to providing artificial intelligence ("AI") for a vehicle or automobile using a distributed system.

BACKGROUND

With rapid integration of motor vehicles with wireless networks, artificial intelligence (AI), and IoT (Internet of Things), the demand for intelligent machine processing and fast real-time response is constantly growing. For example, the cars or vehicles will become smarter and can assist drivers to operate the vehicles and provide entertainment to passengers as well. To implement the integration of vehicle and AI, some technical components, such as data management, model training, and data collection, need to be improved. The conventional machine learning process, for example, is generally an exploratory process which may involve trying different kinds of machine learning models, such as convolutional, RNN (recurrent neural network), attentional networks, et cetera.

Intelligent automobiles are not phones or laptops, and drivers generally need to attend to the task of driving and it can be exceptionally dangerous to become distracted from such task(s). For example, the use of smartphones in cars has led to a significant increase in accidents and fatalities. At the same time, drivers and passengers want the car to provide useful services such as navigation assistance as well as entertainment options. Balancing these needs with safety requires a different approach to applications then those employed by phones.

Machine learning or model training for conventional automobile(s) or vehicle(s) typically concerns a wide variety of hyper-parameters that change the shape of the model and training characteristics. Model training generally requires intensive computation and data collection. With conventional data collection via IoT, AI, real-time analysis, and machine learning, the size of data (real-time data, cloud data, big data, etc.) is voluminous and becomes difficult to handle and digest. For example, a real-time response via a machine learning model with massive data transmission and processing can be challenging. A problem associated with such large data uploading and downloading for machine learning is that it consumes resources and network bandwidth that can degrade overall performance.

SUMMARY

One embodiment discloses an automobile containing a vehicle operated distributed ("VOD") system having multiple subsystems capable of providing network communication via a wireless network system. The automobile includes an outward facing camera ("OFC") subsystem, inward facing camera ("IFC") subsystem, vehicle onboard computer ("VOC"), exterior audio subsystem, interior audio subsystem, and internal sound detector. The OFC subsystem, in one aspect, includes at least one OFC, OFC processor, and OFC database. A function of the OFC subsystem is to recognize a predefined exterior object (e.g., an oncoming pedestrian) in a predefined state (e.g., on a collision course with the vehicle) from a set of exterior images or series of images captured by the OFC based on an exterior image query fetched from the OFC database. The OFC database, in one example, is divided into a historical storage, current storage, future prediction storage and OFC big data storage. The historical storage is configured to store historical records associated with the OFC subsystem, the automobile, and prerecorded vehicle operator(s). The current storage is used to store current, recently recorded, or real-time data associated with the OFC subsystem, the vehicle operating condition, and current vehicle operator. The predictive storage is used to store probability weighted future events associated with the current vehicle and its operating condition. The OFC big data storage is used to store aggregated data captured by the OFC subsystem for the benefit of the automobile as well as other vehicles in the vicinity. For example, the aggregated data may indicate a hazardous condition on the road.

The VOC includes a VOC central processing unit ("CPU"), VOC database, and network manager, wherein the network manager includes an internal network circuit and external network circuit. While the internal network circuit is used to interface with various internal subsystems such as the OFC subsystem, the external network circuit is used to interface with the cloud system via a wireless communication network. A function of the VOC is to provide and/or generate a data stream representing a series of recognized events in accordance with a query which is retrieved from the VOC database. The VOC database includes a historical storage for storing historical records associated with the vehicle, a current storage for storing current or real-time data associated with the vehicle, a predictive storage system with data related to future events and their probabilities and a big data storage for storing data collected by other vehicles as well as for other vehicles. The internal network circuit is configured to selectively signal or instruct at least a portion of subsystems to locally generate data representing observed events based on a VOC query generated in response to a request from the cloud system. The external network circuit is configured to forward a data stream representing an observed event to the cloud system.

The IFC subsystem, in one embodiment, includes at least one IFC, IFC processor, and IFC database, wherein the IFC subsystem is configured to observe interior images inside of vehicle cabin. For example, the IFC subsystem is able to recognize and predict a predefined interior object (such as a face) with a predefined state (such as being asleep or a gaze direction) from a set of interior images captured by the IFC based on an interior image query. The interior image query, in one example, can be generated and transmitted from the VOC.

The exterior audio subsystem includes at least one exterior audio microphone, exterior audio processor, and exterior audio database. A function of the exterior audio subsystem is to capture exterior sound detected by the exterior audio microphone. Upon capturing certain audio sound, the exterior audio subsystem is configured to generate and send a data stream summarizing captured audio sound to the VOC based on an exterior audio query.

The interior audio subsystem, in one embodiment, includes at least one interior audio microphone, interior audio processor, and interior audio database wherein the interior audio subsystem is configured to capture interior sound detected by the interior audio microphone. Upon obtaining the interior audio sound, the interior audio subsystem is configured to generate and send a data stream summarizing captured interior audio sound to the VOC based on an interior audio query.

The automobile, one embodiment, further includes a light detection and ranging ("Lidar") subsystem, radar subsystem, and sonar subsystem wherein the Lidar, radar, and sonar subsystems are coupled to the VOC in a distributed system. The Lidar, in one embodiment, includes at least one light sensor, laser, Lidar processor, and Lidar database for measuring distance between the vehicle and a detected object. The radar subsystem includes at least one radar beam, radar processor, and radar database for object detection. The sonar subsystem includes at least one sonar, sonar processor, and sonar database for detecting object.

One embodiment discloses a method or process for reducing network uploading between a vehicle and a cloud system via a multitier distributed system in the vehicle, the vehicle including a VOC and multiple sensory subsystems. The process is configured to forward a first instruction and a first recognizer from the VOC to a first sensory subsystem in accordance with an inquiry stored in a VOC memory. For example, a visual instruction is transmitted to a video subsystem for searching an object via captured video data from at least one camera. Also, an audio instruction can be transmitted to an audio subsystem for searching for a phrase or a sound (such as a siren) via observed audio data from at least one microphone. In another example, a radar instruction is transmitted to a radar subsystem for monitoring surrounding environment of the vehicle.

After storing the first instruction and first recognizer from the VOC in a first current storage of the first sensory subsystem, a set of first sensory elements is activated based on the first instruction and first recognizer. Upon obtaining first sensed information by the first sensory elements, the first sensed information is processed in response to the first recognizer. Once a first data stream representing a first answer in response to the first instruction and the first recognizer is generated, the process is capable of forwarding the first data stream to the VOC. In one embodiment, upon receiving the inquiry from the cloud system via a wireless communication network, the first instruction and the first recognizer are generated in response to the inquiry. The process is further capable of generating a data stream representing a result to the inquiry in response to the first data stream and uploading the data stream from the VOC to the cloud system via a wireless communication network.

The process, in one aspect, is able to forward a second instruction and a second recognizer from the VOC to a second sensory subsystem in accordance with the inquiry stored in the VOC memory. After storing the second instruction and second recognizer from the VOC in a second current storage of the second sensory subsystem, a set of second sensory elements are activated based on the second instruction and second recognizer. Upon obtaining second sensed information by the set of second sensory elements, the second sensed information is processed in response to the second recognizer. After generating a second data stream representing a second answer in response to the second instruction and the second recognizer, the second data stream is forwarded to the VOC.

Alternatively, one embodiment of the vehicle is organized in a distributed system for reducing network uploading between the vehicle and a cloud system through a multitier distributed system. The process operable by the vehicle is capable of receiving a request by the VOC of the vehicle through a wireless communication network. Upon generating an OFC inquiry configured to capture exterior images outside of the vehicle including an identified recognizer based on the request, an IFC inquiry configured to capture interior images inside of the vehicle including an identity of an operator is also generated. After forwarding the OFC inquiry from the VOC to an OFC subsystem, the IFC inquiry is forwarded from the VOC to an IFC subsystem.

In one aspect, the process is further capable of receiving an OFC result formatted in a data stream sent from the OFC subsystem to the VOC in response to the OFC inquiry, and receiving an IFC result formatted in a data stream sent from the IFC subsystem to the VOC in response to the IFC inquiry. For example, after generating a data stream representing a request result in response to the request based on the OFC result and the IFC result, the request result is forwarded from the VOC to a cloud system through the wireless communication network.

Additional features and benefits of the exemplary embodiment(s) will become apparent from the detailed description, figures and claims set forth below.

BRIEF DESCRIPTION OF THE DRAWINGS

The exemplary embodiment(s) will be understood more fully from the detailed description given below and from the accompanying drawings of various embodiments, which, however, should not be taken to limit the embodiments, but are for explanation and understanding only.

DETAILED DESCRIPTION

Figure 1A:
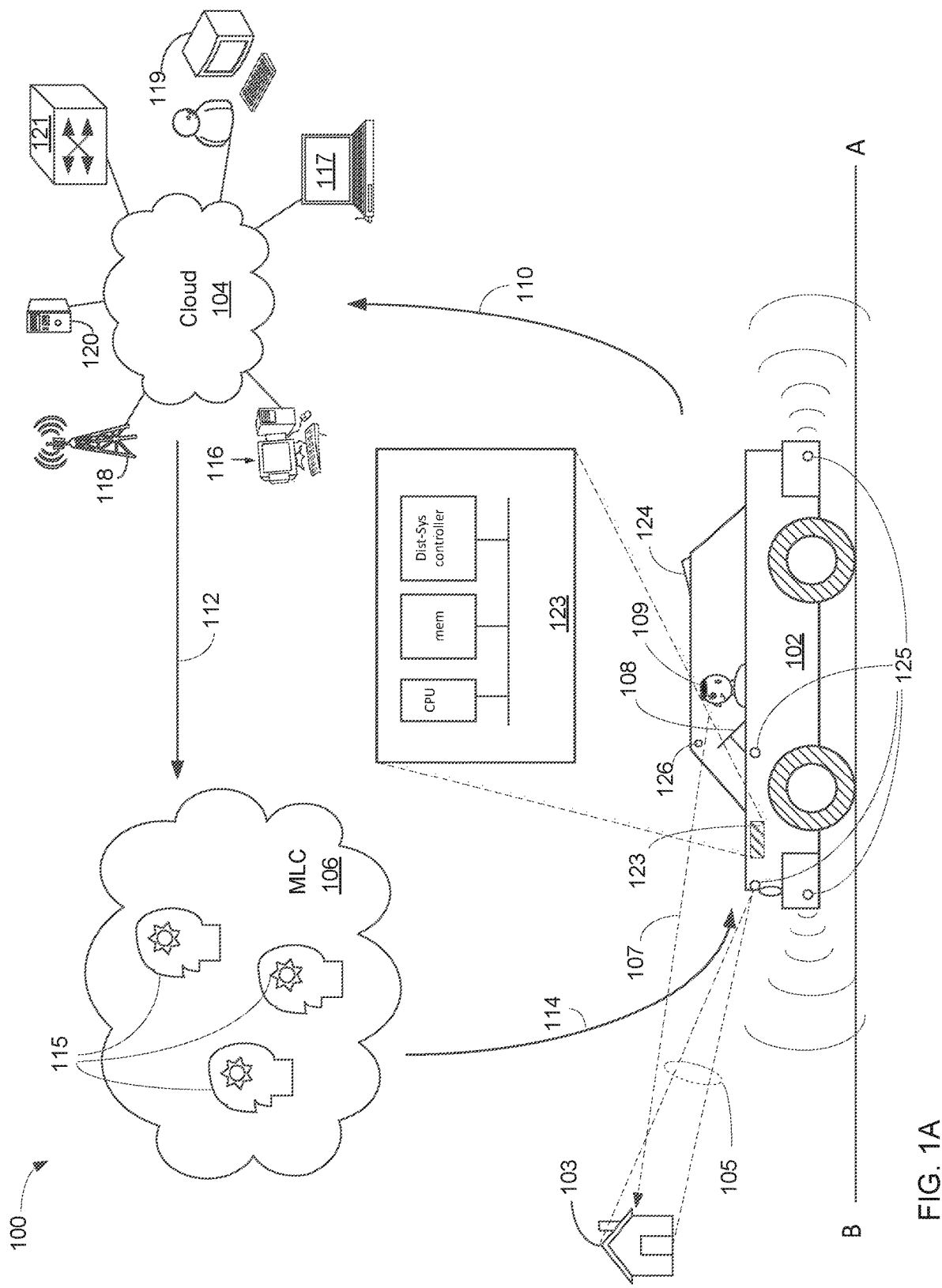
FIG. 1A is a block diagram illustrating a virtuous cycle including an automobile having a distributed system or VOD system for balancing network loading in accordance with one embodiment.

Embodiments are described herein with context of a method and/or apparatus for providing prediction services using a vehicle operated distributed ("VOD") system for network communication.

The purpose of the following detailed description is to provide an understanding of one or more embodiments. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiment(s) of this disclosure.

Various embodiments illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

In accordance with the embodiment(s), the components, process steps, and/or data structures described herein may be implemented using various types of operating systems, computing platforms, computer programs, and/or general-purpose machine. In addition, those of ordinary skills in the art will recognize that devices of less general-purpose nature, such as hardware devices, field programmable gate arrays (FPGAs), application specific integrated circuits (ASICs), or the like, may also be used without departing from the scope and spirit of the concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

The term "system" or "device" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

One embodiment discloses an automobile having multiple distributed subsystems configured to provide communication via a wireless network system. The automobile, in one aspect, includes an outward facing camera ("OFC") subsystem and a vehicle onboard computer ("VOC"). The OFC subsystem, having at least one OFC, OFC processor, and OFC database ("DB"), is configured to recognize a predefined exterior object from a set of exterior images captured by the OFC based on an exterior image query fetched from the OFC DB. The VOC includes a VOC central processing unit ("CPU"), VOC DB, and network manager, wherein the network manager includes an internal network circuit and an external network circuit. The internal network circuit is used for communicating with the OFC subsystem while the external network circuit is used to interface with a cloud system. In one aspect, the VOC is configured to provide a data stream representing a recognized event in accordance with a query retrieved from the VOC DB. A function of the network manager is to facilitate network traffic.

As an example, network traffic refers to the amount or type (or both) of packet streams moving across a network at a given point of time. Different packet streams carry different information and packet size can vary. A larger packet size or packet stream can take longer time duration to travel to its destination. Examples of packet streams include video streams carrying video images, audio streams carrying audio sound, and data streams carrying data. In general, the video streams and audio streams include large packets, and they take more bandwidth to transmit. Conversely, a data steam typically contains smaller packet sizes and takes less bandwidth to transmit from a source to a destination.

FIG. 1A is a block diagram 100 illustrating a virtuous cycle including an automobile having a distributed system or VOD system for balancing network loading in accordance with one embodiment. The virtuous cycle contains a vehicle 102, cloud-based network ("CBN") 104, and machine learning center ("MLC") 106. MCL 106 can be located remotely or in the cloud, such as part of CBN 104. It should be noted that the underlying concept of the exemplary embodiment(s) would not change if one or more blocks (circuit or elements) were added to or removed from diagram 100.

Vehicle 102, in one example, can be a car, bus, train, drone, airplane, truck, and the like, and is capable of motion, like geographically from point A to point B. The term "vehicle," "car," or "automobile" refers to car, automobile, bus, train, drone, airplane, truck, motorcycle, boat, or any other machine configured to transport any number of persons (including a driver) or cargo (or both). Vehicle 102 includes wheels with ABS (anti-lock braking system), auto body, steering wheel 108, exterior or outward facing cameras 125, interior or inward facing camera(s) 126, antenna 124, onboard controller or VOC or VOC system 123, and operator (or driver) 109. It should be noted that outward facing cameras and/or inward facing cameras 125-126 can be installed on the front, side, top, back, and/or inside of vehicle 102. In one example, vehicle 102 also includes various sensors that sense data associated with the vehicle, vehicle status, and/or driver actions. For example, the sensors, not shown in FIG. 1A, can collect information, such as audio, ABS, steering, braking, acceleration, traction control, windshield wipers, GPS (global positioning system), radar, sonar, ultrasound, lidar (Light Detection and Ranging), and the like.

VOD system, in one embodiment, is an independent set of components or subsystems that interacts with VOC or is part of VOC, meaning the VOD and the VOC are a single physical device. VOC includes a CPU (central processing unit), GPU (graphic processing unit), memory, and distributed system controller, wherein the memory can be used to store data from outward facing or exterior cameras 125, inward facing or interior cameras 126, audio sensor, ABS, traction control, steering wheel, CAN-bus sensors, and the like. The distributed system controller is configured to manage various distributed subsystems, such as outward facing camera ("OFC") subsystem, inward facing camera ("IFC") subsystem, exterior audio subsystem, and/or interior audio subsystem. In one aspect, every subsystem, such as OFC subsystem, is a distributed system containing its own processor(s), local memory, and/or interface component, like an interface circuit. A benefit of having a multi-tiered distributed system is to allow the captured information to be processed locally within the sensory subsystem whereby information uploading can be reduced.

In operation, VOC 123 executes an AI model received from MLC 106, and uses antenna 124 to communicate with CBN 104 via a wireless communication network 110. Note that wireless communication network includes, but is not limited to, WIFI, cellular network, Bluetooth network, satellite network, or the like. A function of VOD system is to gather or capture real-time interior information as well as exterior information when vehicle 102 is moving.

CBN 104 includes various digital computing systems, such as, but not limited to, server farm 120, routers/switches 121, cloud administrators 119, connected computing devices 116-117, and network elements 118. A function of CBN 104 is to provide cloud computing which can be viewed as an on-demand Internet based computing service with enormous computing power and resources. Another function of CBN 104 is to improve the labeling of data by correlating captured real-time data with relevant cloud data.

MLC 106, in one embodiment, provides, refines, trains, and/or distributes models 115, such as AI or ML models based on information or data which may be processed and sent from CBN 104. It should be noted that machine learning, in some cases, refers to making predictions based on models generated and maintained by various computational algorithms using historical data as well as current data. A function of MLC 106 is that it is capable of pushing information such as revised AI models to vehicle 102 via a wireless communications network 114. In one aspect, the AI model(s) is used to assist the VOD system to predict events.

IFC 126, which can be part of an IFC subsystem, captures facial images of driver or operator 109 including the location or direction in which operator's eyes focusing. Upon verifying images captured by the OFCs 125 of the OFC subsystem, a focal direction 107 of operator 109 is identified. After obtaining and processing external images relating to focal direction 107, a possible trajectory 105 of the gaze of the operator 109 is obtained. Trajectory 105 and focal direction 107 are subsequently processed and combined in accordance with stored data locally or in the cloud (or both). Objects being looked at by operator 109 may be identified. In this example, the object is a house 103 near the road.

In an exemplary prediction of driver's behavior, VOC 123 records and examines various readings about operator 109, such as pedal position, steering wheel position, mirror setting, seat setting, engine RPM, the seat belts, internal and external temperature, et cetera. With the advent of machine learning, a broad class of derived data and metadata can be extracted from sensors and be used to improve the user experience of being in or driving a vehicle. It should be noted that the extracted data includes confidence and probability metrics for each data element that the machine learning models emit. Such data, which changes in real-time, is presented to an application layer that can use the full context of the vehicle operating in real-time.

Operator or driver 109, in one aspect, can be any driver capable of operating a vehicle. For example, operator 109 can be a teen driver, elderly driver, professional race driver, fleet driver(s), and the like. The fleet drivers can be, but not limited to, delivery drivers, police officers, taxi drivers, ride-sharing drivers, drivers, bus drivers, and the like.

VOD system, in one aspect, is a multi-tiered distributed system configured to delegate processing tasks to various subsystems for facilitating predictive AI and clairvoyant applications. A clairvoyant application, in one example, provides a prediction by localized-downstream-data-processing by various subsystems. The processed data is subsequently uploaded as results to the upstream system(s). The upstream system, in one example, is a system requests a task from a downstream system. For example, VOC 123 which is the upstream system inquiries a particular exterior image from OFC subsystem which is a downstream system. It should be noted that the results or processed data is what the upstream systems or subsystems need. A benefit of localized data processing is to minimize distraction. For example, a series of captured images can contain a lot of useless or irrelevant information. Instead of uploading all captured images to VOC for processing, the application model, also known as a clairvoyant application model, can remove irrelevant data from captured data before uploading to the upstream subsystem(s) such as VOC.

A function of the clairvoyant application model is to provide useful services while minimizing the amount of distraction involved in using such services. For example, after instructing the OFC subsystem to notify VOC if the vehicle is in the vicinity of a certain gas station, a data stream indicating discovery of such a gas station within a predetermined range is uploaded to VOC. Note that the data stream is the processed data instead of captured images of gas stations of a certain brand. After combining the viewing direction of the vehicle driver captured by the IFC subsystem with the information of nearby gas stations of the relevant brand, VOC 123 or VOD system can discern whether the driver was looking at a specific type of gas station An advantage of using a VOD system with a clairvoyant application is to reduce or minimize distraction. A method of minimizing distraction is removing irrelevant information as soon as the data is captured Eliminating irrelevant data or information at the sensory subsystem level can relieve network congestions thereby enhancing overall performance.

Figure 1B:
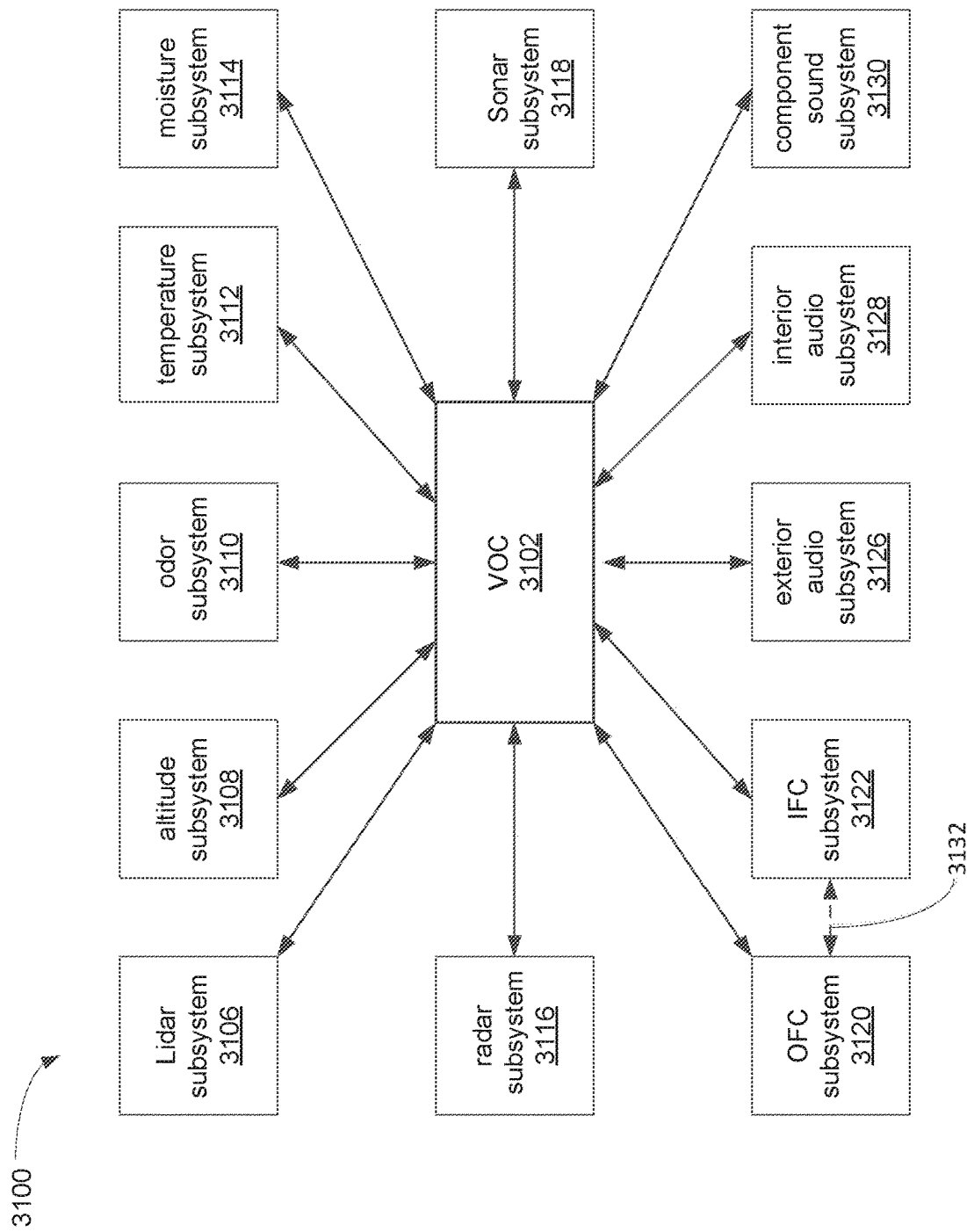
FIG. 1B is a block diagram illustrating a VOD system or in-car multi-tiered distributed system with numerous subsystems for facilitating local processing at a subsystem level in accordance with one embodiment.

FIG. 1B is a block diagram 3100 illustrating a VOD system or in-car multi-tiered distributed system with numerous subsystems for facilitating local processing at a subsystem level in accordance with one embodiment. Diagram 3100 includes VOC 3102, Lidar subsystem 3106, altitude subsystem 3108, odor subsystem 3110, temperature subsystem 3112, moisture subsystem 3114, radar subsystem 3116, sonar subsystem 3118, OFC subsystem 3120, IFC subsystem 3122, exterior audio subsystem 3126, interior audio subsystem 3128, and component sound subsystem 3130. Note that the VOD system can also include other subsystems such as speed sensory subsystem and/or pressure sensory subsystem. It should be noted that the underlying concept of the exemplary embodiment(s) would not change if one or more subsystems (circuit or elements) were added to or removed from diagram 3100.

VOC 3102, in one aspect, includes a CPU or GPU (or both), instruction memory, storage, and distributed system controller. Upon receipt of a request from a cloud system via a wireless communication network, VOC 3102 is able to generate multiple subsystem instructions or inquiries based on the request. The subsystem instructions are subsequently sent to various subsystems such as subsystem 3106-3130 to collect information for the request. The subsystem instruction, query, or inquiry is to facilitate distributed operation that locally decides what to upload after removing irrelevant information. While the instruction memory stores instruction code or microcode for CPU, the storage stores data, such as historical data, concurrent data, real-time data, and/or the like.

To simplify forgoing discussion, the terms "instruction," "inquiry," "query," and "request" can be used interchangeably. In addition, the terms "vehicle operated distributed ("VOD") system," "multi-tiered distributed system," "distributed system," "in-car multi-tiered distributed system," and "distributed subsystem" can be used interchangeably.

Lidar subsystem 3106, in one embodiment, includes a processor, sensor(s), memory, and distributed controller and is configured to use light to obtain measurement(s), like distance. Based on the instruction or inquiry from VOC 3102 which is considered an upstream subsystem, subsystem 3106 is able to collect or capture data using sensors, such as light-based sensors, and transmits a result according to the inquiry to VOC 3102 after filtering or removing irrelevant information from the captured data. The distributed controller, in one example, is used to manage communication between VOC 3102 and another subsystem(s).

Altitude subsystem 3108 includes a processor, sensor(s), memory, and distributed controller and is configured to use altitude sensors (like an altimeter) to obtain altitude related measurement(s). Based on the instruction or inquiry from VOC 3102, subsystem 3108 is able to collect or capture altitude data using sensors and subsequently uploads a result in accordance with the inquiry to VOC 3102 after filtering irrelevant information from the captured data.

Odor subsystem 3110 includes a processor, sensor(s), memory, and distributed controller and is configured to use electric sensors to detect odors. Based on the instruction or inquiry from VOC 3102, subsystem 3110 is able to collect or capture data using odor sensors and subsequently uploads a result in accordance with the inquiry to VOC 3102 after filtering irrelevant information from the captured data.

Temperature subsystem 3112 includes a processor, sensor(s), memory, and distributed controller and is configured to use a thermometer or electronic thermistors to capture temperature related data. Based on the instruction or inquiry from VOC 3102, subsystem 3112 is able to collect or capture data using temperature sensors and subsequently uploads a result in accordance with the inquiry to VOC 3102 after filtering irrelevant information from the captured data.

Moisture subsystem 3114 includes a processor, sensor(s), memory, and distributed controller and is configured to use moisture sensor(s) to measure volumetric water content or moisture levels. Based on the instruction or inquiry from VOC 3102, subsystem 3114 is able to collect or capture data using moisture sensors and subsequently uploads a result in accordance with the inquiry to VOC 3102 after filtering irrelevant information from the captured data.

Radar subsystem 3116 includes a processor, sensor(s), memory, and distributed controller and is configured to use radar to detect and measure distances to surrounding objects. Based on the instruction or inquiry from VOC 3102, subsystem 3116 is able to collect or capture data using radar and subsequently uploads a result in accordance with the inquiry to VOC 3102 after filtering irrelevant information from the captured data.

Sonar subsystem 3118 includes a processor, sensor(s), memory, and distributed controller and is configured to use sound propagation to detect objects or facilitate navigation (or both). As an example, the sonar subsystem 3118 can include any number of transducers configured to transmit acoustic signals, such as in a non-phased array or a phased-array fashion. Based on the instruction or inquiry from VOC 3102, subsystem 3118 is able to collect or capture data using sonar and subsequently uploads a result in accordance with the inquiry to VOC 3102 after filtering irrelevant information from the captured data.

OFC subsystem 3120 includes a processor, sensor(s), memory, and distributed controller and is configured to use any number of exterior video cameras to capture images outside of the vehicle. Based on the instruction or inquiry from VOC 3102, subsystem 3120 is able to capture data including recognizer(s) using one or more exterior mounted cameras. The result in accordance with the inquiry is subsequently sent to VOC 3102 after filtering irrelevant information from the captured data. For example, the recognizer can be, but not limited to, a trademark or other commercial symbol of a business or organization.

IFC subsystem 3122 includes a processor, sensor(s), memory, and distributed controller and is configured to use one or more interior video cameras to capture images inside of the vehicle. Based on the instruction or inquiry from VOC 3102, subsystem 3122 is able to capture data including recognizer(s) using one or more interior mounted cameras. The result in accordance with the inquiry is subsequently sent to VOC 3102 after filtering irrelevant information from the captured data. The recognizer, for example, can be data that identifies the owner or regular known driver of the vehicle via facial recognition.

Exterior audio subsystem 3126 includes a processor, sensor(s), memory, and distributed controller and is configured to use microphones to capture audio outside of the vehicle. Based on the instruction or inquiry from VOC 3102, subsystem 3126 is able to capture data including recognizer(s) using one or more exterior mounted microphones. The result in accordance with the inquiry is subsequently sent to VOC 3102 after filtering irrelevant information from the captured data. The recognizer in this case, for example, can be data identifying audio from an active siren, a horn, or a series of beeps emitted from a vehicle that has been placed in reverse.

Interior audio subsystem 3128 includes a processor, sensor(s), memory, and distributed controller and is configured to use interior microphones to capture sound or conversation inside of the vehicle. Based on the instruction or inquiry from VOC 3102, subsystem 3128 is able to capture data including recognizer(s) using one or more interior mounted microphones. The result in accordance with the inquiry is subsequently sent to VOC 3102 after filtering irrelevant information from the captured data. The recognizer in this case, for example, can be data identifying the voice of a driver or passenger, a person engaged in a speaker-phone conversation with the driver or passenger, or content from a mobile device or a component of the vehicle, like music.

Component sound subsystem 3130 includes a processor, sensor(s), memory, distributed controller, and audio sensors configured to capture sound emitted from an internal component, such as the engine or a specific part of it, like the transmission. Based on the instruction or inquiry from VOC 3102, subsystem 3120 is able to capture data relating to sound using multiple audio sensors or microphones located in the vicinity of monitored components. The result in accordance with the inquiry is subsequently sent to VOC 3102 after filtering irrelevant information from the captured data.

As explained above, the subsystems can be designed to filter out irrelevant information from the captured date before it is sent to the VOC 3102. In one arrangement, the captured data may be generated as a series of frames, and data that is associated with background items can be filtered from the frames. For example, the frames generated by one or more of the IFCs of the ICF subsystem 3122 may include data related to objects that are substantially static and provide little to no useful information about the driver, passenger, or other objects that are monitored. In this case, the seats, doors, windows, or items being transported by the vehicle may remain stationary, and the IFC subsystem 3122 can reduce the amount of data to be processed by filtering out any references to these insignificant objects. As an example, the previous frame may serve as a reference frame, and pixels associated with the stationary, insignificant objects in the current frame, upon comparison with the pixels of the reference frame, can be stripped out from the current frame.

As part of this comparison, the positioning and motion vectors of the pixels (or blocks of pixels) may be evaluated to identify the irrelevant objects. The spectral angles of the pixels of the current frame and the reference frame can also be analyzed to segment out irrelevant objects based on color comparisons. The use of reference frames may apply to other subsystems, such as removing audio data related to a constant sound, like the background noise generated by the engine when the vehicle is cruising at a relatively uniform speed. It should be noted that the process of filtering irrelevant information from the captured data can involve the use of one or more AI models to discern the important information to the vehicle as well as entities other than the vehicle.

The VOD system is organized in a tiered architecture in which VOC 3102 is coupled to multiple subsystems 3106-3130 in a star organization. Alternatively, the subsystems including VOC 3120 can be organized in a ring shape. Depending on the applications, some subsystems can be coupled directly together via a connection 3132, which can be wired, wireless, or a combination of both.

Figure 1C:
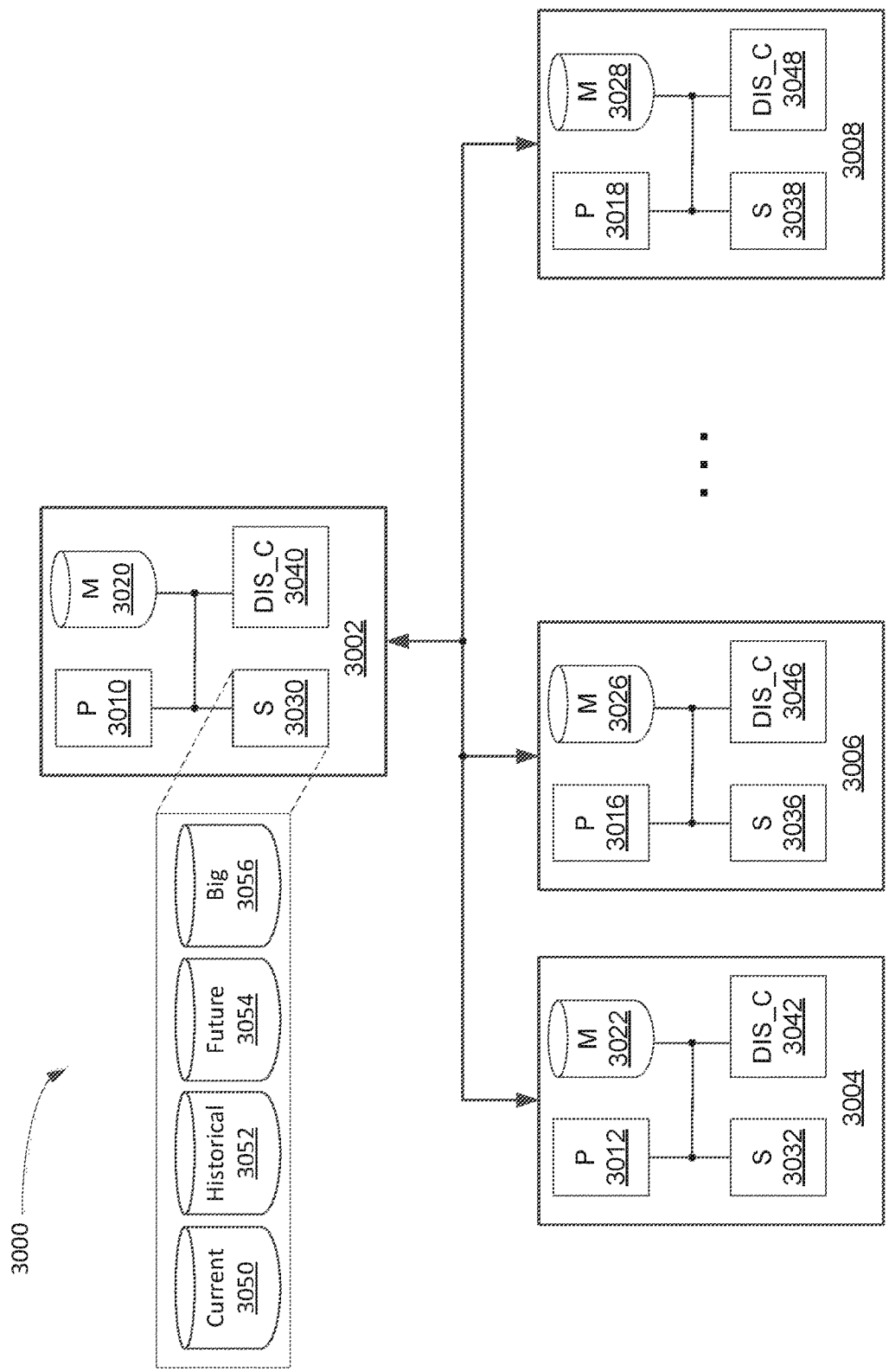
FIG. 1C is a block diagram illustrating subsystems organized in a distributed system showing local storage and processing capabilities in accordance with one embodiment.

FIG. 1C is a block diagram 3000 illustrating subsystems 3002-3008 organized in a distributed system showing local storage and processing capabilities in accordance with one embodiment. Subsystems 3002-3008 include processors 3010-3018, memories 3020-3028, storages 3030-3038, and distributed controllers 3040-3048. Subsystems 3002-3008 are connected by an internal bus system operated inside of the vehicle. It should be noted that the underlying concept of the exemplary embodiment(s) would not change if one or more subsystems (circuit or elements) were added to or removed from diagram 3000.

The processor, such as processor 3010, is configured to process data based on instructions stored in a memory, such as memory 3020. The distributed controller, such as distributed controller 3040, are used to communicate with VOC or other systems. The memory, such as memory 3020, is configured to store code as well as inquiries. While code can be used by the process for execution, inquiries are received from VOC for data processing. It should be noted that memory and storage, such as storage 3030, can be a single device or component.

The storage device, circuit, or chip, such as storage 3030, is used to store data. The data can be further categorized into historical data 3052, current or real-time data 3050, predictive future data 3054, and big data 3056. The historical data 3052, in one embodiment, is a set of data relating to the historical operation of the corresponding subsystem in connection with the vehicle. For example, for the IFC subsystem, the historical data may include the facial images of regular operator(s) or driver(s). The current data 3050 is the real-time or substantially real-time data relating to a particular subsystem of the vehicle. For example, for the IFC subsystem, the current data may be data collected during a current trip of the vehicle or within the past thirty minutes of operation, which may indicate that the current driver or operator is not the regular driver. In this example, the historical data 3052 is data collected that is from previous trips or beyond the thirty-minute window for the current data 3050. The future data 3054 may include estimates or predictions of future behavior generated by the subsystem with a probability distribution of the likelihood of the outcome. The big data 3056 or aggregated data, also known as data warehouse, is useful data that may or may not be related to the vehicle or the subsystem, but it may be useful to the vehicle and other vehicles. Thus, big data 3056 means data that is collected from a group of two or more participating vehicles. For example, the OFC subsystem detects traffic congestion due to an accident. Although the traffic congestion in affecting the vehicle in which the OFC subsystem is contained, such information can be useful to other vehicles by facilitating the dissemination of notifications to them that provide a warning of the current traffic backup. In another example, the IFC can be asked by the VOD system to predict when a driver will become unfocused based on his or her past distractive behavior.

One embodiment discloses an automobile containing multiple distributed subsystems 3002-3008 capable of providing network communication via a wireless network system. The automobile includes OFC subsystem 3004, IFC subsystem 3006, VOC 3002, and exterior audio subsystem 3008. The OFC subsystem 3004, in one aspect, includes at least one OFC, OFC processor 3012, and OFC database 3032. A function of the OFC subsystem 3004 is to recognize a predefined object or symbol from a set of exterior images captured by the OFC based on an exterior image query fetched from the OFC memory 3022. The OFC database 3032, in one example, is divided into a historical storage, current storage, and OFC big data storage.

The historical storage is configured to store historical records associated with the OFC subsystem, the automobile, and previous vehicle operator(s). The current storage is used to store current, recently recorded, or real-time data associated with the OFC subsystem, vehicle operating condition, and current vehicle operator. The future storage, in one aspect, is used to store predictions of future behavior of vehicle operation conditions, external objects, and the current vehicle operator. The OFC big data storage is used to store aggregated data captured by the OFC subsystem for the benefit of the automobile as well as other vehicles in the vicinity. For example, the aggregated data may indicate a hazardous condition on the road.

VOC 3002 includes a VOC CPU 3010, VOC database 3030, VOC memory 3020, and network manager 3040, wherein network manager 3040 includes an internal network circuit and external network circuit. In one aspect, VOC database 3030 and VOC memory 3020 are merged into a single storage circuit or component. While the internal network circuit is used to interface with various internal subsystems, such as the OFC subsystem 3004, the external network circuit is used to interface with the cloud system via a wireless communication network. A function of VOC 3002 is to provide or generate a data stream representing a recognized event in accordance with a query which is retrieved from the VOC database. The VOC database includes a historical storage for storing historical records associated with the vehicle, a current storage for storing current or real-time data associated with the vehicle, a predictive future storage for storing future predictions of the vehicle and associate objects and a big data storage for storing data collected by other vehicles as well as for other vehicles. The internal network circuit is configured to selectively signal or instruct at least a portion of subsystems to locally generate predictive data representing observed events based on a VOC query generated in response to a request from the cloud system. Such predictions, for instance, can be cached in the future storage system. The external network circuit is configured to forward a data stream representing an observed event to the cloud system.

IFC subsystem 3006, in one embodiment, includes at least one IFC, IFC processor 3016, and IFC database 3036, wherein IFC subsystem 3006 is configured to observe interior images inside of a vehicle cabin. For example, IFC subsystem 3006 is able to recognize a predefined interior object from a set of interior images captured by the IFC based on an interior image query. The interior image query, in one example, can be generated and transmitted from the VOC.

Exterior audio subsystem 3008 includes at least one exterior audio microphone, exterior audio processor 3018, and exterior audio database 3038. A function of the exterior audio subsystem is to capture exterior sound detected by the exterior audio microphone. Upon capturing certain audio sound, the exterior audio subsystem is configured to generate and send a data stream summarizing captured audio sound to the VOC based on an exterior audio query.

The automobile or vehicle further includes various other subsystems, such as an interior audio subsystem and internal sound detector. For example, the interior audio subsystem also includes at least one interior audio microphone, interior audio processor, and interior audio database wherein the interior audio subsystem is configured to capture interior sound detected by the interior audio microphone. Upon obtaining the interior audio sound, the interior audio subsystem is configured to generate and send a data stream summarizing captured interior audio sound to the VOC based on an interior audio query.

The automobile, one embodiment, further includes a light detection and ranging ("Lidar") subsystem, radar subsystem, and sonar subsystem wherein the Lidar, radar, and sonar subsystems are coupled to the VOC in a distributed system. The Lidar, in one embodiment, includes at least one light sensor, laser, Lidar processor, and Lidar database for measuring distance between the vehicle and a detected object. The radar subsystem includes at least one radar transmitter and receiver, radar processor, and radar database for object detection. The sonar subsystem includes at least one sonar, sonar processor, and sonar database for detecting object.

Figure 1D:
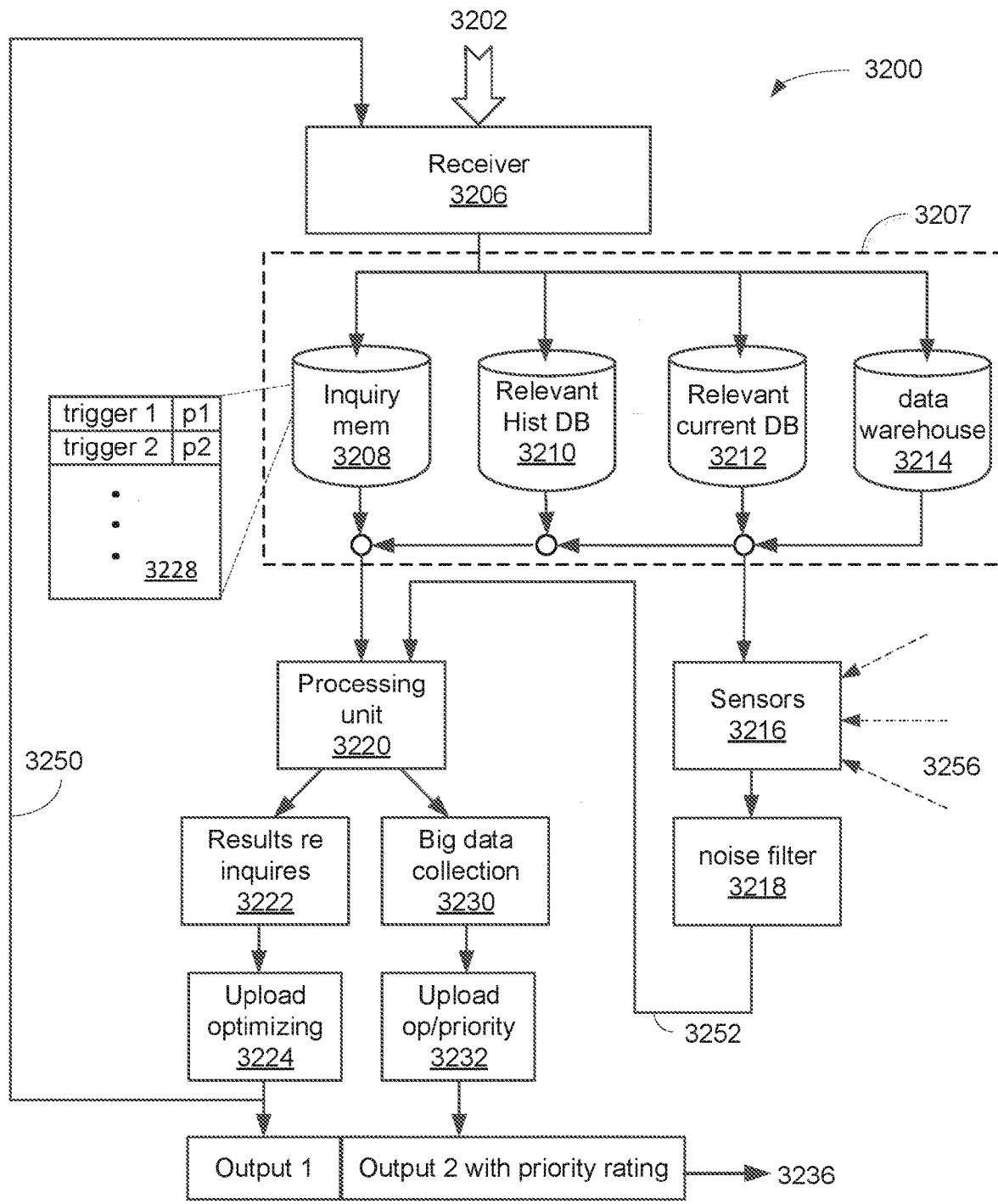
FIG. 1D is a logic diagram illustrating a logic flow within a distributed system in a vehicle for reducing uploading data in accordance with one embodiment.

FIG. 1D is a logic diagram 3200 illustrating a logic flow within a distributed system in a vehicle for reducing uploading data in accordance with one embodiment. Diagram 3200 illustrates a logic flow of a subsystem such as OFC subsystem. The subsystem includes a storage device 3207 containing an inquiry memory 3208. Inquiry memory 3208 includes a table 3228 containing multiple entries. Each entry of table 3228 includes a trigger and a priority code associated to the trigger. For example, trigger 1 has a priority code P1 and trigger 2 has a priority code P2. Depending on the priority code, the time to upload the captured data in accordance with the trigger can vary. With a higher priority, the data will be uploaded as soon as it is available. With a lower priority, the captured data may be uploaded only when the cost of bandwidth is low. It should be noted that the underlying concept of the exemplary embodiment(s) would not change if one or more blocks (circuit or elements) were added to or removed from diagram 3200.

In operation, when receiver 3206 receives an inquiry 3202 from an upstream subsystem, such as VOC, inquiry 3202 is stored in inquiry memory 3208. Based on inquiry 3202, relevant historical data from DB (database) 3210, current data from DB 3212, and big data from warehouse 3214, sensors or sensory device 3216 collects or captures data 3256. After the filter 3218 filters the noise or irrelevant data, the filtered data, as indicated by numeral 3252, is forwarded to central processing unit 3220. Central processing unit 3220 generates a result or results 3222 in response to inquiry 3202 and big data 3230 in response to other triggers. Result or results 3222 are uploaded at block 3224 as output 1 based on the priority. Depending on the applications, output 1 may be stored in current DB 3212. Big data 3230, in one aspect, is also uploaded as output 2 at block 3232 based on the priority code, as indicated by numeral 3236. It should be noted that noise filter 3218 and central processing unit 3220 can be a single component or circuit.

Figure 1E:
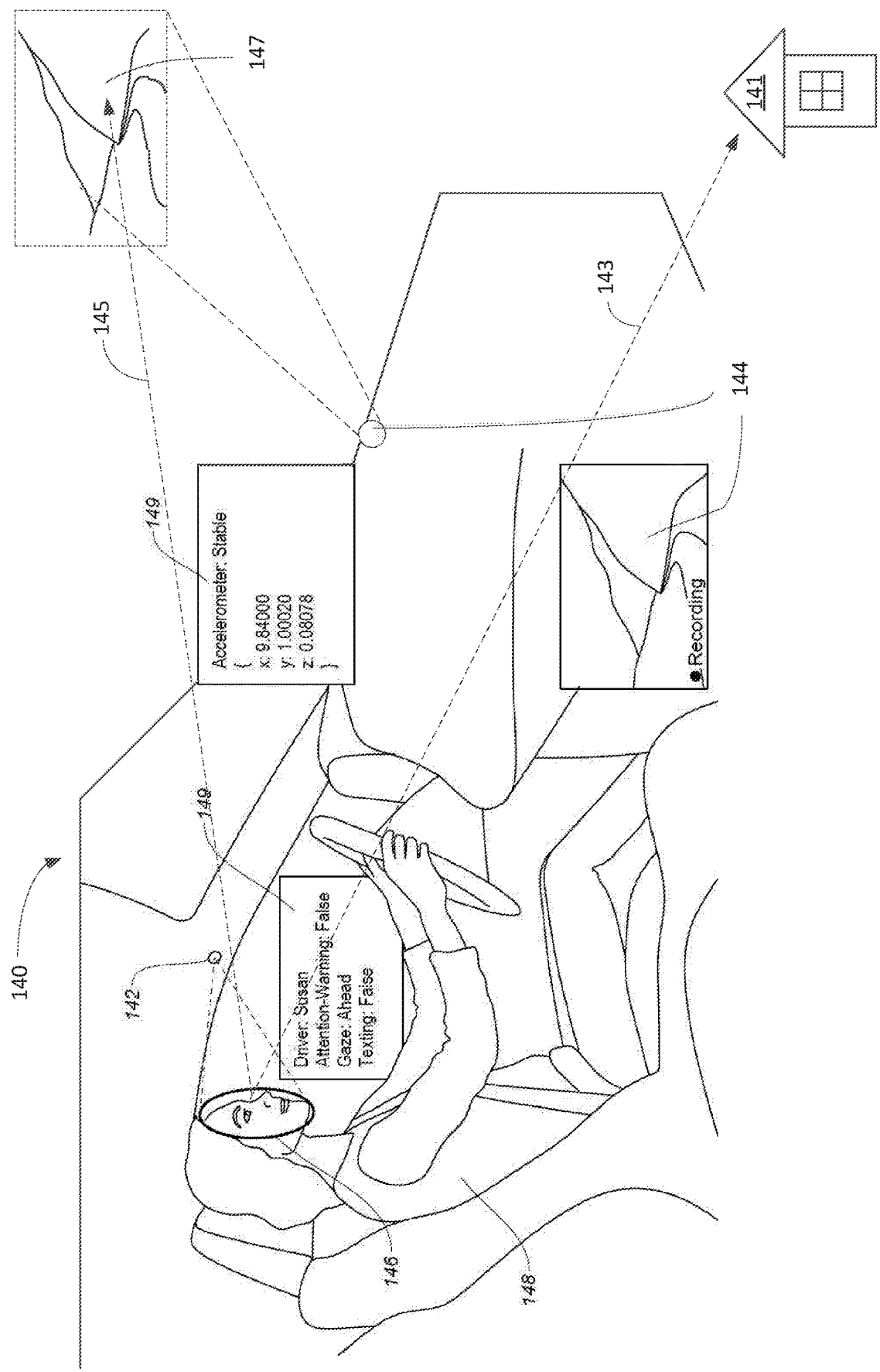
FIG. 1E is a block diagram illustrating a distributed system using an OFC subsystem and IFC subsystem to predict an event in accordance with one embodiment.

FIG. 1E is a block diagram 140 illustrating a distributed system using an OFC subsystem and IFC subsystem to predict an event in accordance with one embodiment. Diagram 140 illustrates a driver 148, inward facing camera(s) 142, and exterior camera 144. In one aspect, camera 142, also known as interior camera or 360-degree camera, monitors or captures the driver's facial expression 146 or the driver's (or operator's) body language (or both). Upon reading status 149, which indicates stable with accelerometer, ahead with gaze, hands on steering wheel (no texting), the VOD system concludes that driver is behaving normally and is looking at a direction 143 or 145. In one example, the driver's identity ("ID") can be verified using images captured by interior camera 142.

The VOD system, for example, is able to detect which direction driver 148 is looking, whether driver 148 is distracted, whether driver 148 is texting, whether the identity of driver is determined via a facial recognition process or some other technique, or where driver 148 pays attention. It should be noted that the car may contain multiple forward-facing exterior cameras (or 360-degree camera(s)) 144 capable of capturing a 360 view which can be used to correlate with other views to identify whether driver 148 checks the rear-view mirror to see cars behind the vehicle or checks the side-view mirror of the vehicle when the car turns. Based on observed information, the labeled data may indicate whether the driver is paying attention to where the vehicle is heading. Alternatively, the collected images or labeled data can be used to retrain the VOD system, which may predict driver's behavior as well as safety rating for driver 148.

During an operation, the interior images captured by inward facing camera(s) 142 can show a location or direction in which operator 148 is focused based on relative eye or head (or both) positions of operator 148. Once the direction, such as direction 145, is identified, the VOD system obtains external images captured by outward facing camera(s) 144. After identifying image 145 is where the operator is paying attention based on direction 145, the image 147 is recorded and processed. Alternatively, if the VOD system expects operator 148 to look in the direction 145 based on current speed and traffic conditions while detecting operator 148 is actually looking at a house 141 based on trajectory view 143, a signal indicating where the driver is looking can be generated.

It should be noted that the labeled data may include various parameters, such as whether the driver looks left or right before crossing an intersection or whether the driver gazes at correct (or intended) locations or directions while driving. The VOD system collects data from various sensory subsystems, such as Lidar, radar, sonar, thermometers, audio detector, pressure sensor, airflow, optical sensor, infrared reader, speed sensor, altitude sensor, and the like, to establish an operating environment or profile. The information can change based on the behavior of the occupants in the vehicle. For example, if the occupants are noisy, listening to loud music, shouting, drinking, eating, dancing, such behavior(s) can affect the overall parameters associated with the driver.

Figure 1F:
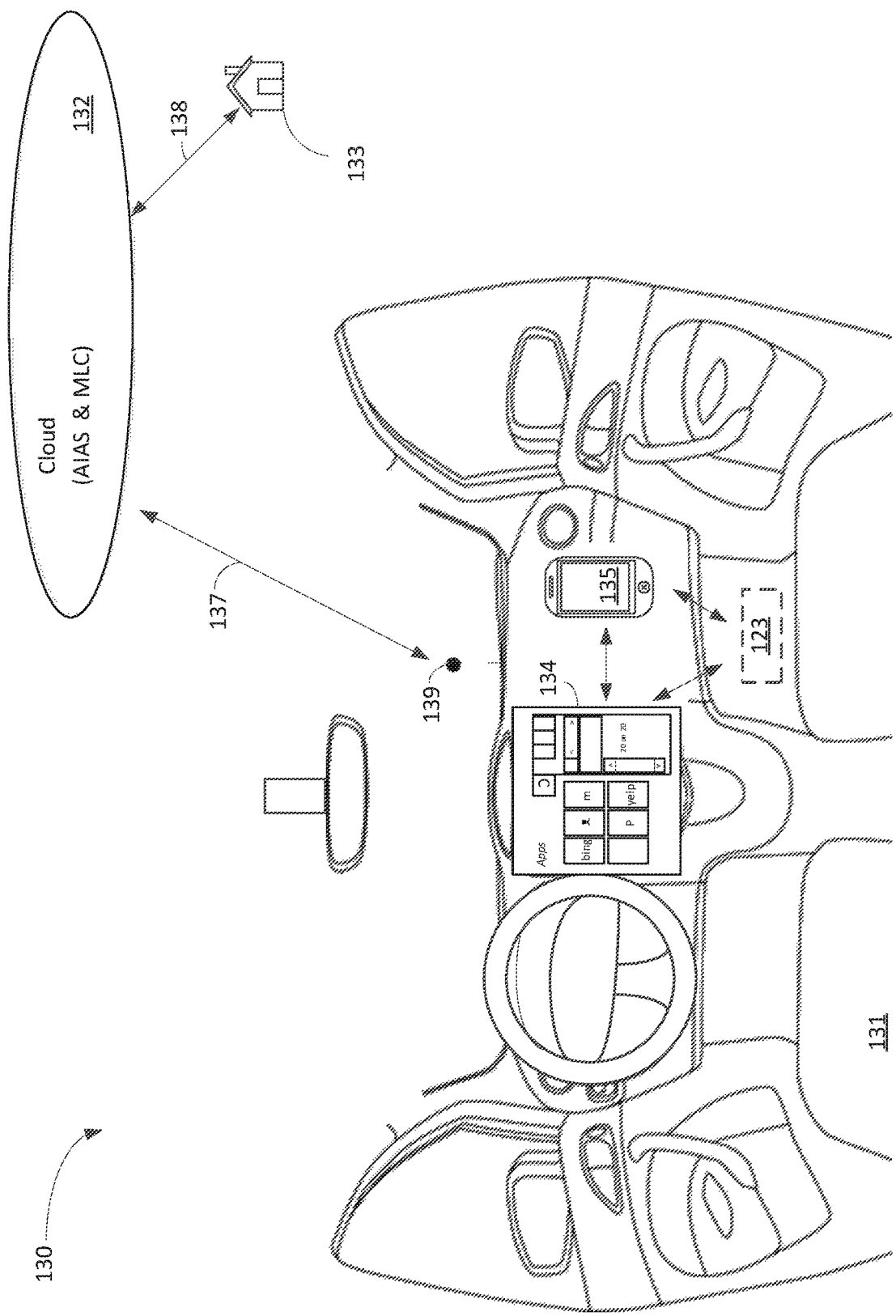
FIG. 1F is a block diagram illustrating a process of generating reports relating to driver status using a distributed model via a virtuous cycle in accordance with one embodiment.

FIG. 1F is a block diagram 130 illustrating a process of generating reports relating to driver status using a distributed model via a virtuous cycle in accordance with one embodiment. Diagram 130 includes vehicle 131, cloud 132, and subscriber 133, wherein cloud 132 can further include machine learning centers, historical driver data, and big data. In one embodiment, the VOD system, which may be partially residing in cloud 132, is capable of providing subscribed information or captured information to subscriber(s) 133. It should be noted that the underlying concept of the exemplary embodiment(s) would not change if one or more blocks (circuit or elements) were added to or removed from diagram 130.

Vehicle 131 includes an infotainment unit 134, smart phone 135, VOC 123, and antenna 139. For example, infotainment unit 134 is coupled to a head-end unit such, as VOC 123, to collect information about driving habits, skill, or ability associated with an operator based on the driver's condition, exterior environment, and internal equipment/vehicle status. The driver's condition includes driver ID or detected distractions, such as talking over a phone, texting, occupant distraction, and the like. Exterior environment refers to traffic conditions, road conditions, weather conditions, or nearby drivers. The equipment or vehicle status indicates automobile mechanical conditions, such as ABS application, sharp steering, hard braking, sudden acceleration, traction control activation, windshield wipers' movement, or airbag deployment. The collected information, after being filtered, is forwarded to cloud 132 for further processing.

Subscriber 133, in one example, can be an insurance company, family members, law enforcement authority, car dealers, auto manufactures, or fleet companies. In one aspect, subscriber 133 is an insurance company which wants to assess risks associated with certain group of drivers, such as teen drivers or elderly drivers based on prediction reports. For example, upon receipt of collected information from vehicle 131 to cloud 132, as indicated by numeral 137, the VOD system can at least partially predict the driver's next move based on the driver's historical data as well as big data. The prediction report is subsequently forwarded to subscriber 133 from cloud 132 as indicated by number 138.

As an example, smartphone 135 is used for identifying the driver's ID as well as to provide communication to cloud 132 via its cellular network access. Smartphone 135 can also be used to couple to VOC 123 for facilitating hyperscale or data scale from cloud data to embedded data. Similarly, the embedded data can also be scaled before passing onto the cloud.

An advantage of employing the VOD system is that it can provide a prediction in connection with a group of drivers while a large portion of data processing or filtering is performed by various subsystems to enhance overall system performance.

Figure 2A:
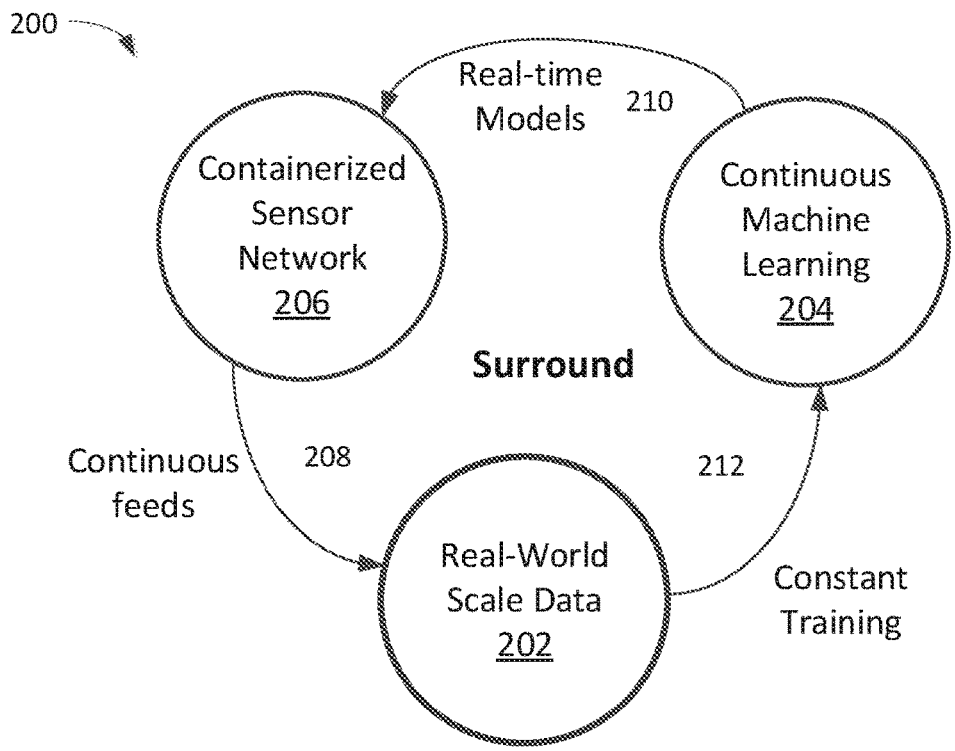
FIGS. 2A-2B are block diagrams illustrating a virtuous cycle capable of facilitating a vehicle operated distributed ("VOD") system using a distributed model in accordance with one embodiment.
Figure 2B:
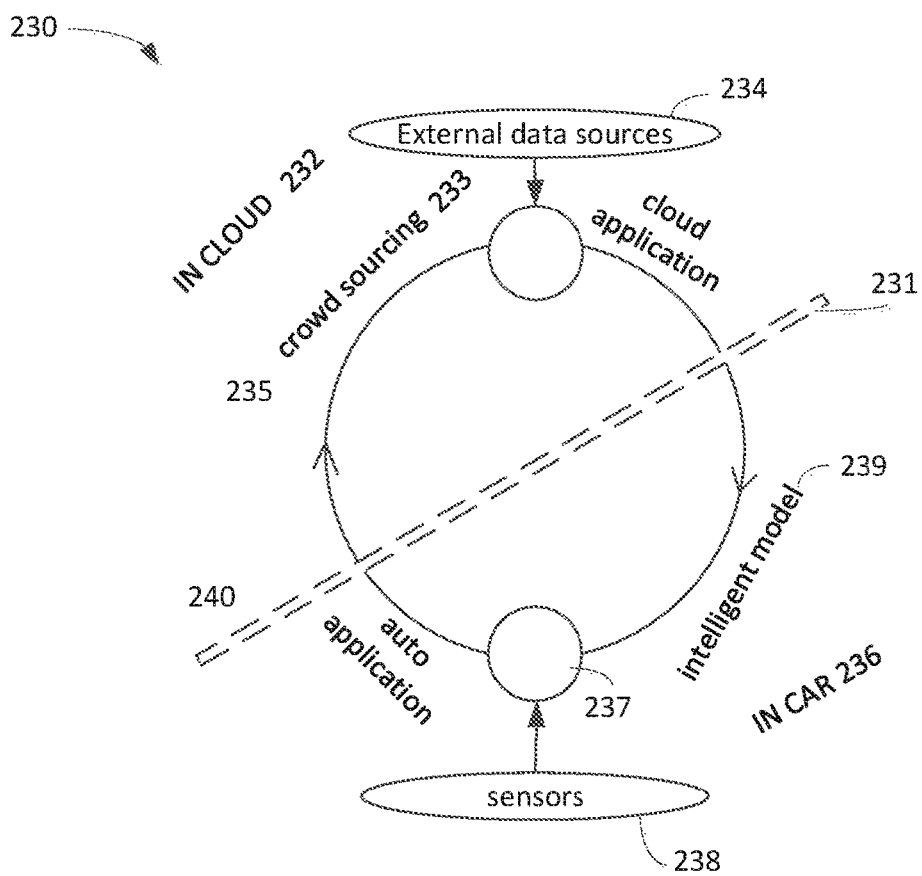

FIGS. 2A-2B are block diagrams illustrating a virtuous cycle capable of facilitating a vehicle operated distributed ("VOD") system using a distributed model in accordance with one embodiment. Diagram 200, which is similar to diagram 100 shown in FIG. 1A, includes a containerized sensor network 206, real-world scale data 202, and continuous machine learning 204. In one embodiment, continuous machine learning 204 pushes real-time models to containerized sensor network 206 as indicated by numeral 210. Containerized sensor network 206 continuously feeds captured data or images to real-world scale data 202 with uploading in real-time or in a batched format. Real-world scale data 202 provides labeled data to continuous machine learning 204 for constant model training as indicated by numeral 212. It should be noted that the underlying concept of the exemplary embodiment(s) would not change if one or more blocks (or elements) were added to or removed from FIG. 2A.

The virtuous cycle illustrated in diagram 200, in one embodiment, is configured to implement the VOD system wherein containerized sensor network 206 is similar to vehicle 102 as shown in FIG. 1A and real-world scale data 202 is similar to CBN 104 shown in FIG. 1A. Also, continuous machine learning 204 is similar to MCL 106 shown in FIG. 1A. In one aspect, containerized sensor network 206, such as an automobile, contains a containerized sensing device capable of collecting surrounding information or images using onboard sensors or sensor network when the car is in motion. Based on the AI model, selective recording the collected surrounding information is selectively recorded to a local storage or memory.

Real-world scale data 202, such as cloud or CBN, which is wirelessly coupled to the containerized sensing device, is able to correlate with cloud data and recently obtained IA data for producing labeled data. For example, real-world scale data 202 generates IA labeled data based on historical IA cloud data and the surrounding information sent from the containerized sensing device.

Continuous machine learning 204, such as MLC or cloud, is configured to train and improve IA models based on the labeled data from real-world scale data 202. With continuous gathering data and training model(s), the VOD system will be able to learn, obtain, and/or collect all available data for the population samples.

In one embodiment, a virtuous cycle includes partitionable machine learning networks, training partitioned networks, partitioning a network using sub-modules, and composing partitioned networks. For example, a virtuous cycle involves data gathering from a device, creating intelligent behaviors from the data, and deploying the intelligence. In one example, partition idea includes knowing the age of a driver which could place or partition "dangerous driving" into multiple models and selectively deployed by an "age detector." An advantage of using such partitioned models is that models should be able to perform a better job of recognition with the same resources because the domain of discourse is now smaller. Note that, even if some behaviors overlap by age, the partitioned models can have common recognition components.

It should be noted that more context information collected, a better job of recognition can be generated. For example, "dangerous driving" can be further partitioned by weather condition, time of day, traffic conditions, et cetera. In the "dangerous driving" scenario, categories of dangerous driving can be partitioned into "inattention," "aggressive driving," "following too closely," "swerving," "driving too slowly," "frequent braking," deceleration, ABS event, et cetera.

For example, by resisting a steering behavior that is erratic, the car gives the driver direct feedback on his behavior—if the resistance is modest enough then if the steering behavior is intentional (such as trying to avoid running over a small animal) then the driver is still able to perform their irregular action. However, if the driver is texting or inebriated, then the correction may alert him to his behavior and get his attention. Similarly, someone engaged in "road rage" who is driving too close to another car may feel resistance on the gas pedal. A benefit of using IAS is to identify consequences of a driver's "dangerous behavior," as opposed to recognizing the causes (texting, etc.). The machine intelligence should recognize the causes as part of the analysis for offering corrective action.

In one aspect, a model, such as an IA model, includes some individual blocks that are trained in isolation to the larger problem (e.g. weather detection, traffic detection, road type, etc.). Combining the blocks can produce a larger model. Note that the sample data may include behaviors that are clearly bad (ABS event, rapid deceleration, midline crossing, being too close to the car in front, etc.). In one embodiment, one or more sub-modules are built. The models include weather condition detection and traffic detection for additional modules intelligence, such as "correction vectors" for "dangerous driving."

An advantage of using a virtuous cycle is that it can learn and detect objects, such as IAs in the real world.

FIG. 2B is a block diagram 230 illustrating an alternative exemplary virtuous cycle capable of detecting IA in accordance with one embodiment. Diagram 230 includes external data source 234, sensors 238, crowdsourcing 233, and intelligent model 239. In one aspect, components/activities above dotted line 231 are operated in cloud 232, also known as in-cloud components. Components/activities below dotted line 231 are operated in car 236, also known as in-device or in-car components. It should be noted that the underlying concept of the exemplary embodiment(s) would not change if one or more blocks (or elements) were added to or removed from FIG. 2B.

In one aspect, in-cloud components and in-device components coordinate to perform desirable user specific tasks. While in-cloud component leverages massive scale to process incoming device information, cloud applications leverage crowd sourced data to produce applications. External data sources can be used to contextualize the applications to facilitate intellectual crowdsourcing. For example, in-car (or in-phone or in-device) portion of the virtuous cycle pushes intelligent data gathering to the edge application. In one example, edge applications can perform intelligent data gathering as well as intelligent in-car processing. It should be noted that the amount of data gathering may rely on sensor data as well as intelligent models which can be loaded to the edge.

Figure 3:
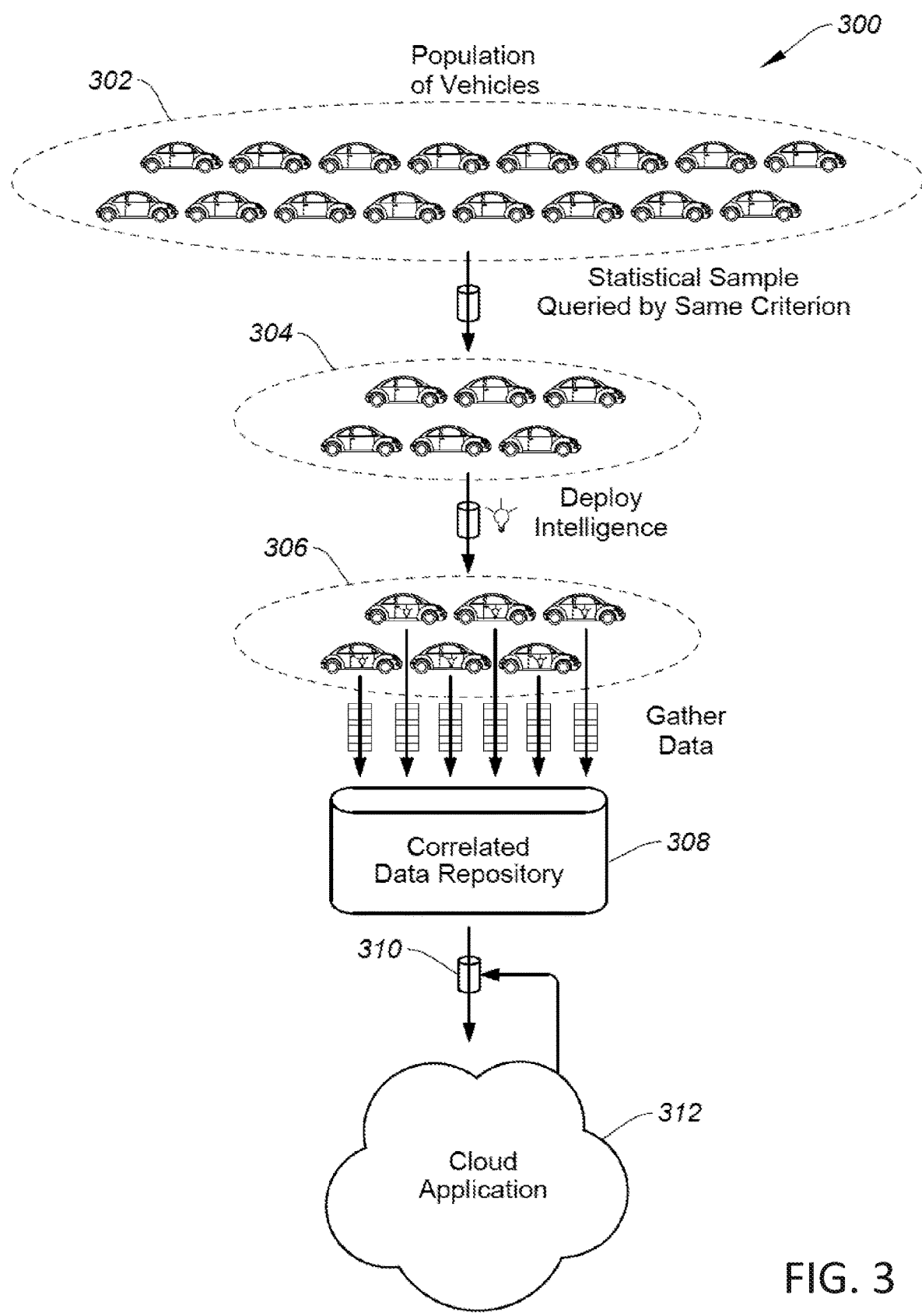
FIG. 3 is a block diagram illustrating a cloud-based network using crowdsourcing approach to improve distributed model(s) for a VOD system in accordance with one embodiment.

FIG. 3 is a block diagram 300 illustrating a cloud-based network using a crowdsourcing approach to improve distributed model(s) for a VOD system in accordance with one embodiment. Diagram 300 includes population of vehicles 302, sample population 304, model deployment 306, correlation component 308, and cloud application 312. It should be noted that the underlying concept of the exemplary embodiment(s) would not change if one or more blocks (or samples) were added to or removed from FIG. 3.

Crowdsourcing is a process of using various sourcing or specific models generated or contributed from other cloud or Internet users for achieving needed services. For example, crowdsourcing relies on the availability of a large population of vehicles, phones, or other devices to source data 302. For example, a subset of available devices such as sample 304 is chosen by some criterion such as location to perform data gathering tasks. To gather data more efficiently, intelligent models are deployed to a limited number of vehicles 306 based on geographical coordinates and their locations to observe, for instance, a particular location of interest. Such deployment of intelligent models can reduce the need of large uploading and processing a great deal of data in the cloud. It should be noted that the chosen devices, such as cars 306, monitor the environment with the intelligent model and create succinct data about what has been observed which minimizes the amount of data uploaded and distributes the processing into individual cameras for maximum efficiency. This distribution of requests may be hierarchical, so that for example, if a particular set of cameras is managed by a city and additional vehicles are handled by various automakers, the system uses a "map/reduce" scheme to collect the data. That is, in the first phase of crowdsourcing, a request for a particular data object (for example an accident at an intersection) is broadcast to a layered set of sensors. Each layer then forwards on the request to vehicles or static cameras or other sensors it manages pruning sensors that are not in the geo-time-spatial parameters. These requests are then stored as classifications of interest. In the "reduce" phase, sensors generate cloud relevant data. The cloud relevant data is highly compressed because only the event needs to be sent up and not an entire stream of video. In some cases, this data may be a prediction based on, for example, vehicle speeds or the sounds of an accident, in which case a probability is also sent. The "reduced" data generated by the intelligent models is uploaded to the correlated data store as indicated by numeral 308. It should be noted that the uploading can be performed in real-time for certain information or at a later time for other types of information depending on the need as well as condition of network traffic.

Correlated component 308 includes correlated data storage capable of providing a mechanism for storing and querying uploaded data. Cloud applications 312, in one embodiment, leverage the correlated data to produce new intelligent models, create crowd sourced applications, and other types of analysis.

Figure 4:
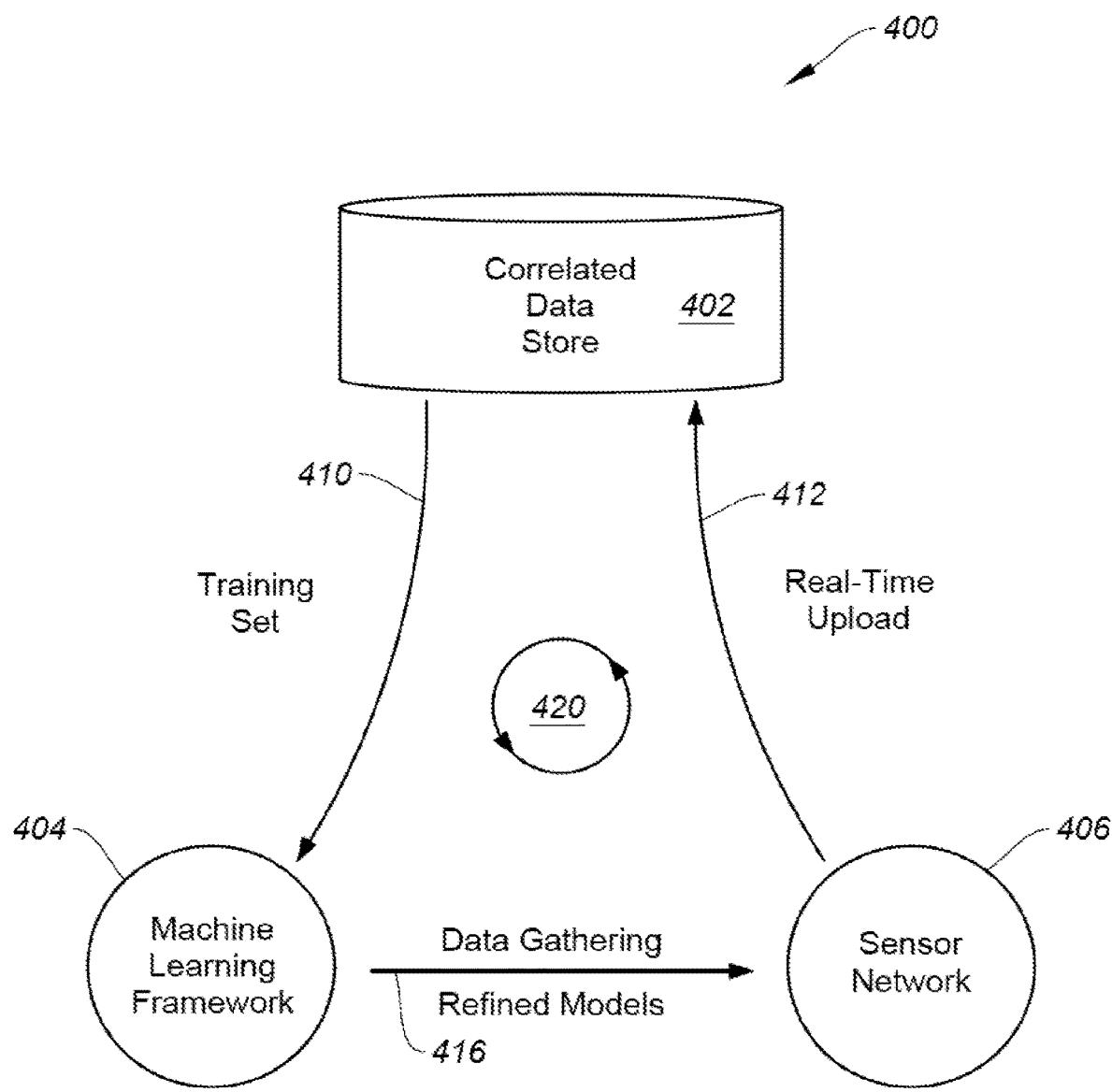
FIG. 4 is a block diagram illustrating an AI model or VOD system using the virtuous cycle in accordance with one embodiment.

FIG. 4 is a block diagram 400 illustrating an AI model or VOD system using the virtuous cycle in accordance with one embodiment. Diagram 400 includes a correlated data store 402, machine learning framework 404, and sensor network 406. Correlated data store 402, machine learning framework 404, and sensor network 406 are coupled by connections 410-416 to form a virtuous cycle as indicated by numeral 420. It should be noted that the underlying concept of the exemplary embodiment(s) would not change if one or more blocks (circuit or elements) were added to or removed from FIG. 4.

In one embodiment, correlated data store 402 manages real-time streams of data in such a way that correlations between the data are preserved. Sensor network 406 represents the collection of vehicles, phones, stationary sensors, and other devices, and is capable of uploading real-time events into correlated data store 402 via a wireless communication network 412 in real-time or in a batched format. In one aspect, stationary sensors include, but not limited to, municipal cameras, webcams in offices and buildings, parking lot cameras, security cameras, and traffic cams capable of collecting real-time images.

The stationary cameras, such as municipal cameras and webcams in offices, are usually configured to point to streets, buildings, parking lots wherein the images captured by such stationary cameras can be used for accurate labeling. To fuse between motion images captured by vehicles and still images captured by stationary cameras can track object(s) such as car(s) more accurately. Combining or fusing stationary sensors and vehicle sensors can provide both labeling data and historical stationary sampling data also known as stationary "fabric." It should be noted that during the crowdsourcing applications, fusing stationary data (e.g. stationary cameras can collect vehicle speed and position) with real-time moving images can improve ML process.

Machine learning ("ML") framework 404 manages sensor network 406 and provides mechanisms for analysis and training of ML models. ML framework 404 draws data from correlated data store 402 via a communication network 410 for the purpose of training modes and/or labeled data analysis. ML framework 404 can deploy data gathering modules to gather specific data as well as deploy ML models based on the previously gathered data. The data upload, training, and model deployment cycle can be continuous to enable continuous improvement of models.

Figure 5:
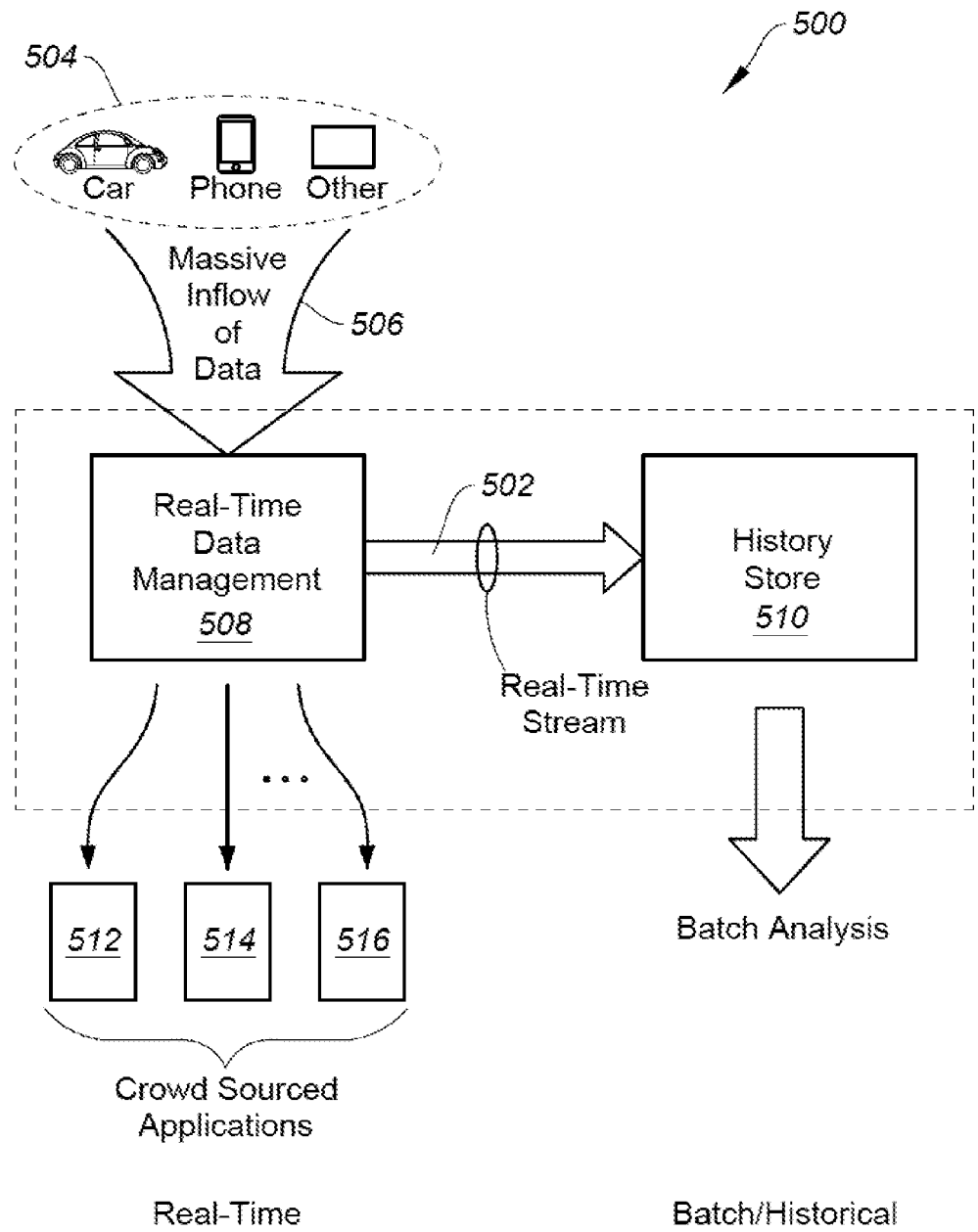
FIG. 5 is a block diagram illustrating an exemplary process of correlating data for the AI model according to the VOD system in accordance with one embodiment.

FIG. 5 is a block diagram 500 illustrating an exemplary process of correlating data for the AI model according to the VOD system in accordance with one embodiment. Diagram 500 includes source input 504, real-time data management 508, history store 510, and crowd sourced applications 512-516. In one example, source input 504 includes cars, phones, tablets, watches, computers, and the like capable of collecting massive amount of data or images which will be passed onto real-time data management 508 as indicated by numeral 506. It should be noted that the underlying concept of the exemplary embodiment(s) would not change if one or more blocks (or elements) were added to or removed from FIG. 5.

In one aspect, a correlated system includes a real-time portion and a batch/historical portion. The real-time part aims to leverage new data in near or approximately real-time. Real-time component or management 508 is configured to manage a massive amount of influx data 506 coming from cars, phones, and other devices 504. In one aspect, after ingesting data in real-time, real-time data management 508 transmits processed data in bulk to the batch/historical store 510 as well as routes the data to crowd sourced applications 512-516 in real-time.

Crowd sourced applications 512-516, in one embodiment, leverage real-time events to track, analyze, and store information that can be offered to user, clients, and/or subscribers. Batch-Historical side of correlated data store 510 maintains a historical record of potentially all events consumed by the real-time framework. In one example, historical data can be gathered from the real-time stream and it can be stored in a history store 510 that provides high performance, low cost, and durable storage. In one aspect, real-time data management 508 and history store 510 coupled by a connection 502 are configured to perform IA data correlation as indicated by dotted line.

Figure 6:
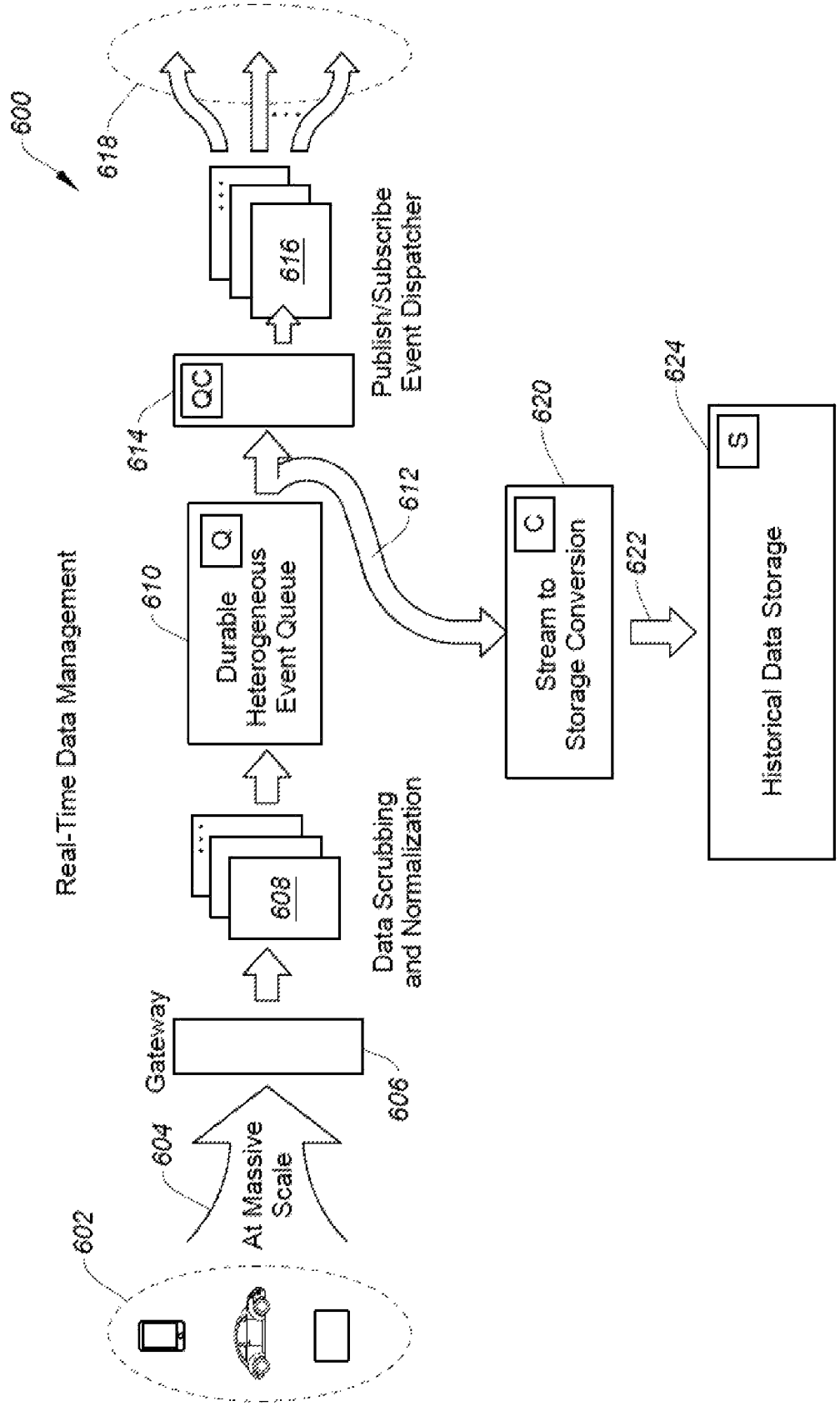
FIG. 6 is a block diagram illustrating an exemplary process of real-time data management for an AI model or VOD system in accordance with one embodiment.

FIG. 6 is a block diagram 600 illustrating an exemplary process of real-time data management for an AI model or VOD system in accordance with one embodiment. Diagram 600 includes data input 602, gateway 606, normalizer 608, queue 610, dispatcher 616, storage conversion 620, and historical data storage 624. The process of real-time data management further includes a component 614 for publish and subscribe. It should be noted that the underlying concept of the exemplary embodiment(s) would not change if one or more blocks (circuit or elements) were added to or removed from FIG. 6.

The real-time data management, in one embodiment, is able to handle large numbers (i.e., tens of millions) of report events to the cloud as indicated by numeral 604. API (application program interface) gateway 606 can handle multiple functions such as client authentication and load balancing of events pushed into the cloud. The real-time data management can leverage standard HTTP protocols. The events are routed to stateless servers for performing data scrubbing and normalization as indicated by numeral 608. The events from multiple sources 602 are aggregated together into a scalable/durable/consistent queue as indicated by numeral 610. An event dispatcher 616 provides a publish/subscribe model for crowd source applications 618 which enables each application to look at a small subset of the event types. The heterogeneous event stream, for example, is captured and converted to files for long-term storage as indicated by numeral 620. Long-term storage 624 provides a scalable and durable repository for historical data.

Figure 7:
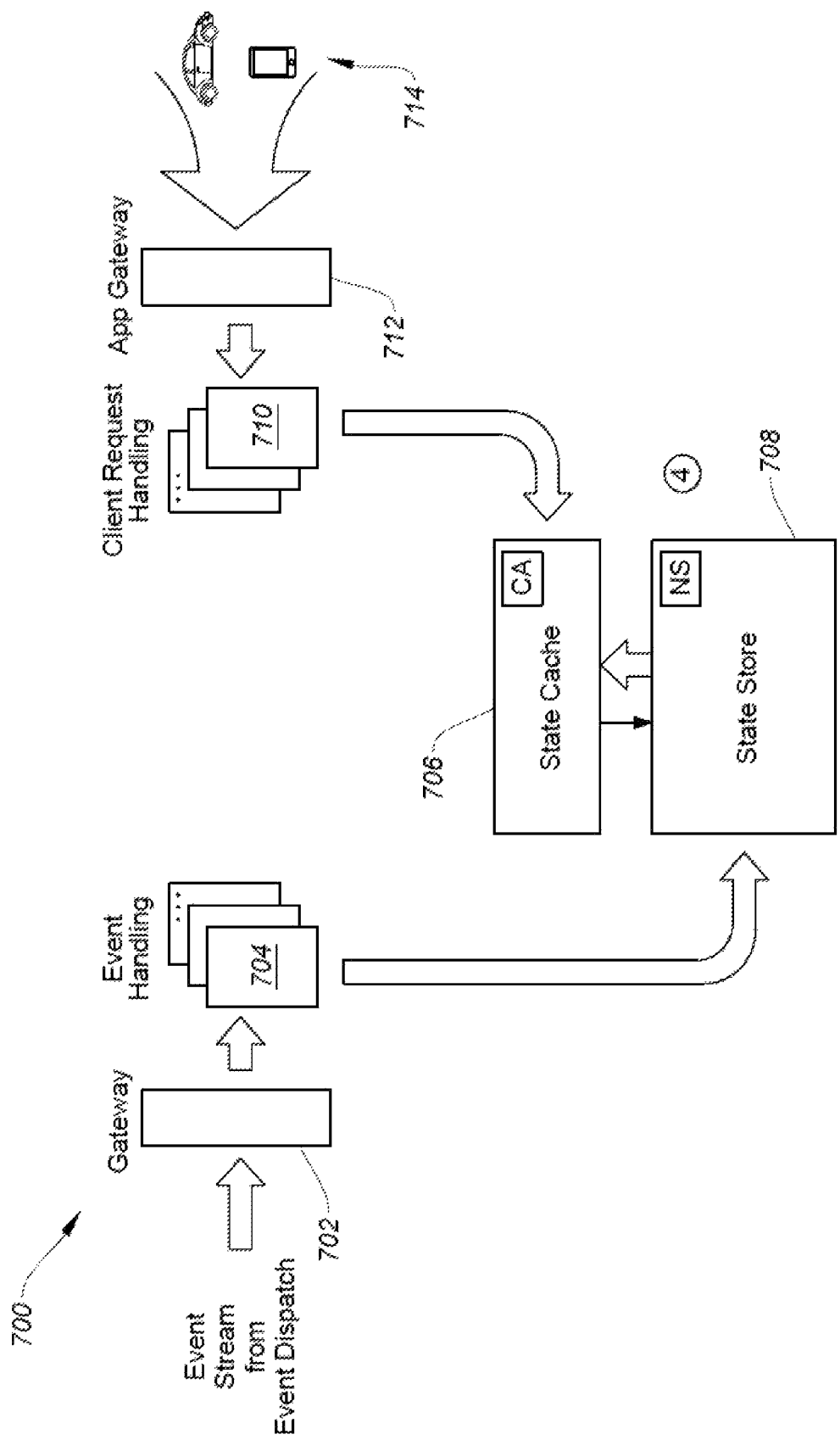
FIG. 7 is a block diagram illustrating a crowd sourced application model for artificial intelligence ("AI") model and/or a VOD system in accordance with one embodiment.

FIG. 7 is a block diagram 700 illustrating a crowd sourced application model for AI model and/or a VOD system in accordance with one embodiment. Diagram 700 includes a gateway 702, event handler 704, state cache 706, state store 708, client request handler 710, gateway 712, and source input 714. In one example, gateway 702 receives an event stream from an event dispatcher and API gateway 712 receives information/data from input source 714. It should be noted that the underlying concept of the exemplary embodiment(s) would not change if one or more blocks (or elements) were added to or removed from FIG. 7.

The crowd sourced application model, in one embodiment, facilitates events to be routed to a crowd source application from a real-time data manager. In one example, the events enter gateway 702 using a simple push call. Note that multiple events are handled by one or more servers. The events, in one aspect, are converted into inserts or modifications to a common state store. State store 708 is able to hold data from multiple applications and is scalable and durable. For example, state store 708, besides historical data, is configured to store present data, information about "future data," and/or data that can be shared across applications such as predictive AI.

State cache 706, in one example, is used to provide fast access to commonly requested data stored in state store 708. Note that application can be used by clients. API gateway 712 provides authentication and load balancing. Client request handler 710 leverages state store 708 for providing client data.

In an exemplary embodiment, an onboard IA model is able to handle real-time IA detection based on triggering events. For example, after ML models or IA models for IA detection have been deployed to all or most of the vehicles, the deployed ML models will report to collected data indicating IAS for facilitating issuance of real-time warning for dangerous event(s). The information or data relating to the real-time dangerous event(s) or IAS is stored in state store 708. Vehicles 714 looking for IA detection can, for example, access the IAS using gateway 712.

Figure 8:
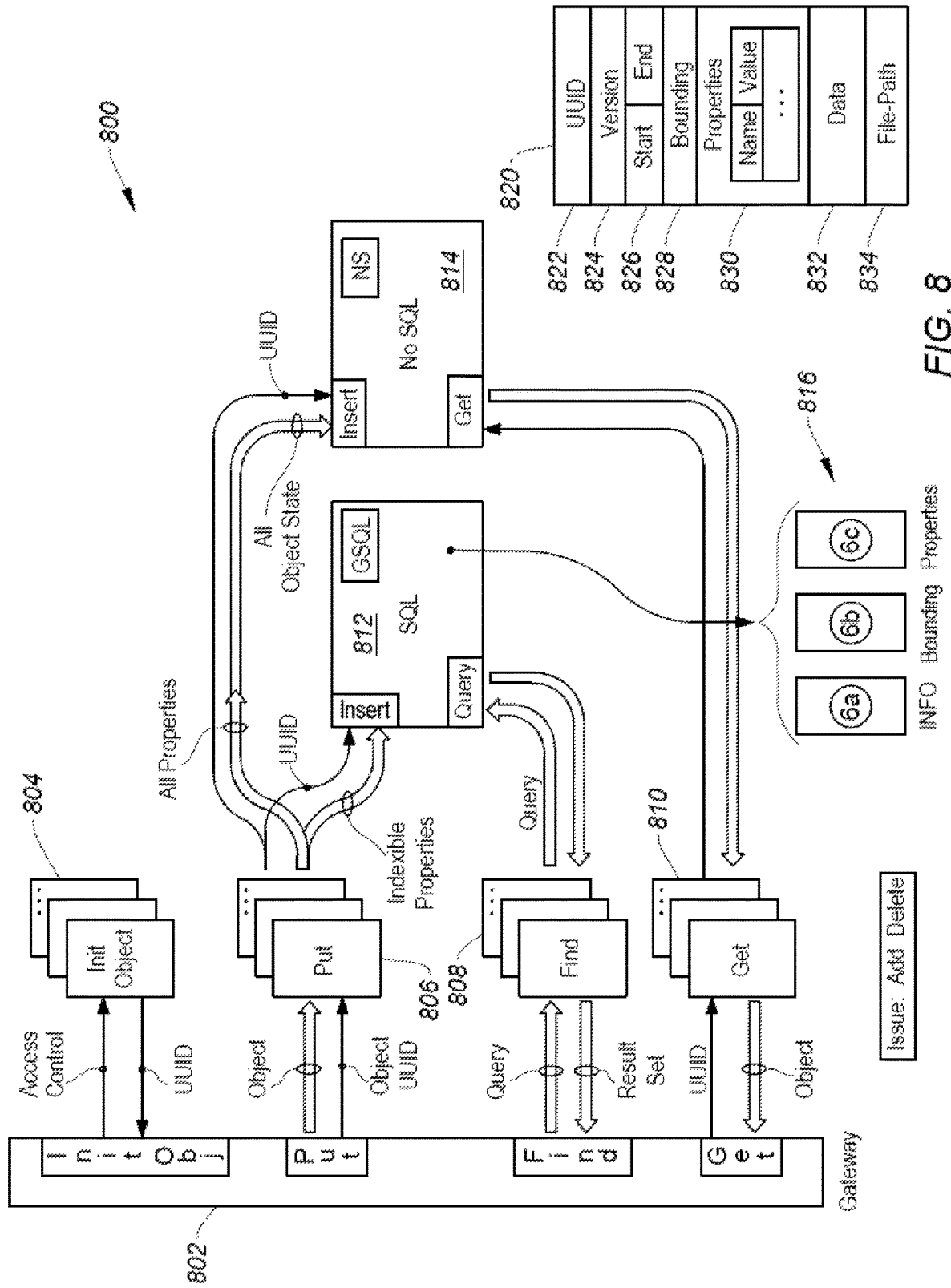
FIG. 8 is a block diagram illustrating the storing of AI related data using a geo-spatial objective storage for a VOD system in accordance with one embodiment.

FIG. 8 is a block diagram 800 illustrating a method of storing AI related data using a geo-time-spatial objective storage for a VOD system in accordance with one embodiment. Diagram 800 includes gateway 802, initial object 804, put call 806, find call 808, get call 810, SQL (Structured Query Language) 812, non-SQL 814, and geo-time-spatial object storage 820. It should be noted that the underlying concept of the exemplary embodiment(s) would not change if one or more blocks (circuit or elements) were added to or removed from FIG. 8.

Geo-time-spatial object storage 820, in one aspect, stores or holds objects which may include time period, spatial extent, ancillary information, and optional linked file. In one embodiment, geo-spatial object storage 820 includes UUID (universally unique identifier) 822, version 824, start and end time 826, bounding 828, properties 830, data 832, probability, and various properties of the object and file-path 834. For example, while UUID 822 identifies an object, all objects have version(s) 824 that allow schema to change in the future. Start and end time 826 indicates an optional time period with a start time and an end time.

In one embodiment, start times that are in the past represent inferences with less than a 100% probability of inferences of events that the system or subsystem has not seen or observed, but which has inferred through machine learning or regression methods. Start times in the future represent predictions of the location and behavior of an object in the future. Such predictions will be less than 100% accurate and thus, the subsystem or systems often offer a range of predictions. The system allows for a probability distribution along with a geo-spatial distribution that represents an estimate, in one example, of the location of an object and its properties (such as speed, or whether someone is inattentive). Also, the system allows a "store procedure" instead of actual data to be store. For example, the stored procedure may be computational more efficient to store a programmable function that generates the geo-time-spatial information rather than enumerating all the possibilities. The function may for instance say that the probability of an objects location in the past is "normally distributed" in a particular area whereby the caller will get that data from the stored procedure rather than the raw data itself.

An optional bounding geometry 828 is used to specify spatial extent of an object. An optional set of properties 830 is used to specify name-value pairs. Data 832 can be binary data. An optional file path 834 may be used to associate with the object of a file containing relevant information such as MPEG (Moving Picture Experts Group) stream.

In one embodiment, API gateway 802 is used to provide access to the service. Before an object can be added to the store, the object is assigned an UUID which is provided by the initial object call. Once UUID is established for a new object, the put call 804 stores the object state. The state is stored durably in Non-SQL store 814 along with UUID. A portion of UUID is used as hash partition for scale-out. The indexable properties includes version, time duration, bounding, and properties which are inserted in a scalable SQL store 812 for indexing. The Non-SQL store 814 is used to contain the full object state. Non-SQL store 814 is scaled-out using UUID as, for example, a partition key.

SQL store 812 is used to create index tables that can be used to perform queries. SQL store 812 may include three tables 816 containing information, bounding, and properties. For example, information holds a primary key, objects void, creation timestamp, state of object and object properties "version" and "time duration." Bounding holds the bounding geometry from the object and the id of the associated information table entry. Properties hold property name/value pairs from the object stored as one name/value pair per row along with ID of associated info table entry.

Find call 808, in one embodiment, accepts a query and returns a result set, and issues a SQL query to SQL store 812 and returns a result set containing UUID that matches the query.

Figure 9:
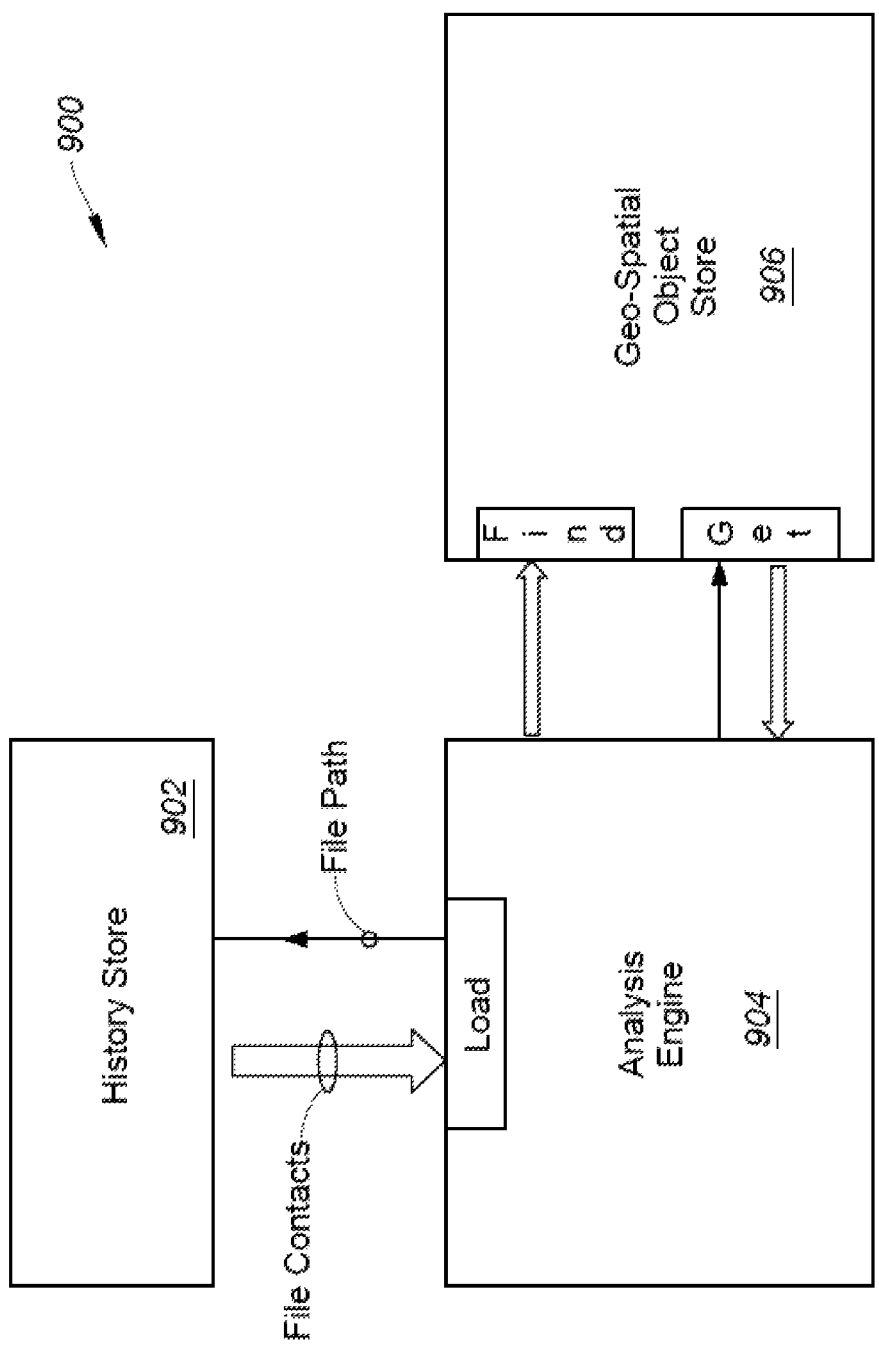
FIG. 9 is a block diagram illustrating an exemplary approach of an analysis engine analyzing collected data for a VOD system in accordance with one embodiment.

FIG. 9 is a block diagram 900 illustrating an exemplary approach of analysis engine analyzing collected data for a VOD system in accordance with one embodiment. Diagram 900 includes history store 902, analysis engine 904, and geo-time-spatial object store 906. It should be noted that the underlying concept of the exemplary embodiment(s) would not change if one or more blocks (circuit or elements) were added to or removed from FIG. 9.

In one aspect, diagram 900 illustrates analysis engine 904 containing ML training component capable of analyzing labeled data based on real-time captured IA data and historical data. The data transformation engine, in one example, interacts with Geo-time-spatial object store 906 to locate relevant data and with history store to process the data. Optimally, the transformed data may be stored.

It should be noted that virtuous cycle employing ML training component to provide continuous model training using real-time data as well as historical samples and deliver IA detection model for one or more subscribers. A feature of virtuous cycle is able to continuous training a model and able to provide a real-time or near real-time result. It should be noted that the virtuous cycle is applicable to various other fields, such as, but not limited to, business intelligence, law enforcement, medical services, military applications, and the like.

Figure 10:
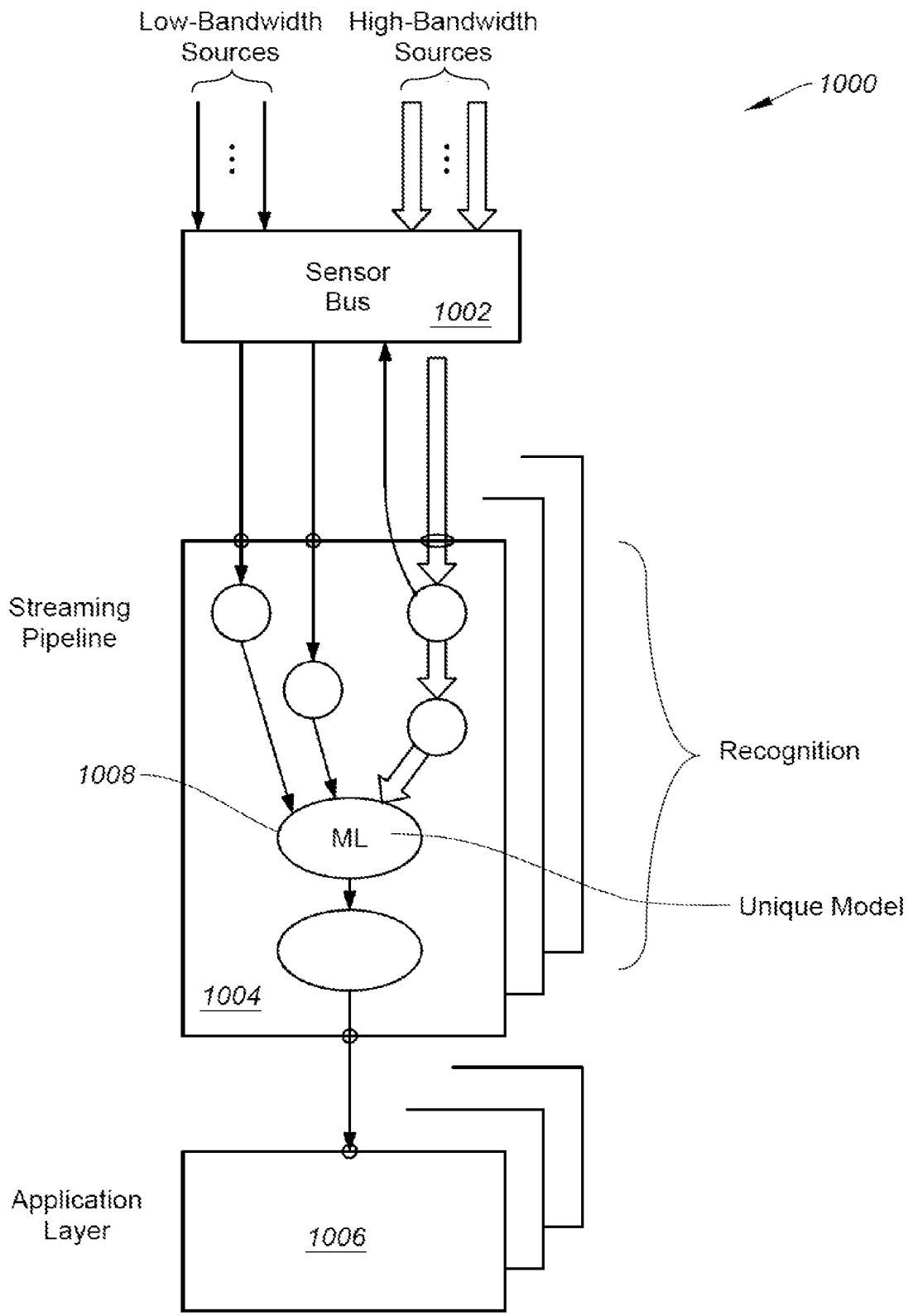
FIG. 10 is a block diagram illustrating an exemplary containerized sensor network used for sensing information for a VOD system in accordance with one embodiment.

FIG. 10 is a block diagram 1000 illustrating an exemplary containerized sensor network used for sensing information for a VOD system in accordance with one embodiment. Diagram 1000 includes a sensor bus 1002, streaming pipeline 1004, and application layer 1006 wherein sensor bus 1002 is able to receive low-bandwidth sources and high-bandwidth sources. Streaming pipeline 1004, in one embodiment, includes ML capable of generating unique model such as model 1008. It should be noted that the underlying concept of the exemplary embodiment(s) would not change if one or more blocks (circuit or elements) were added to or removed from FIG. 10.

Figure 11:
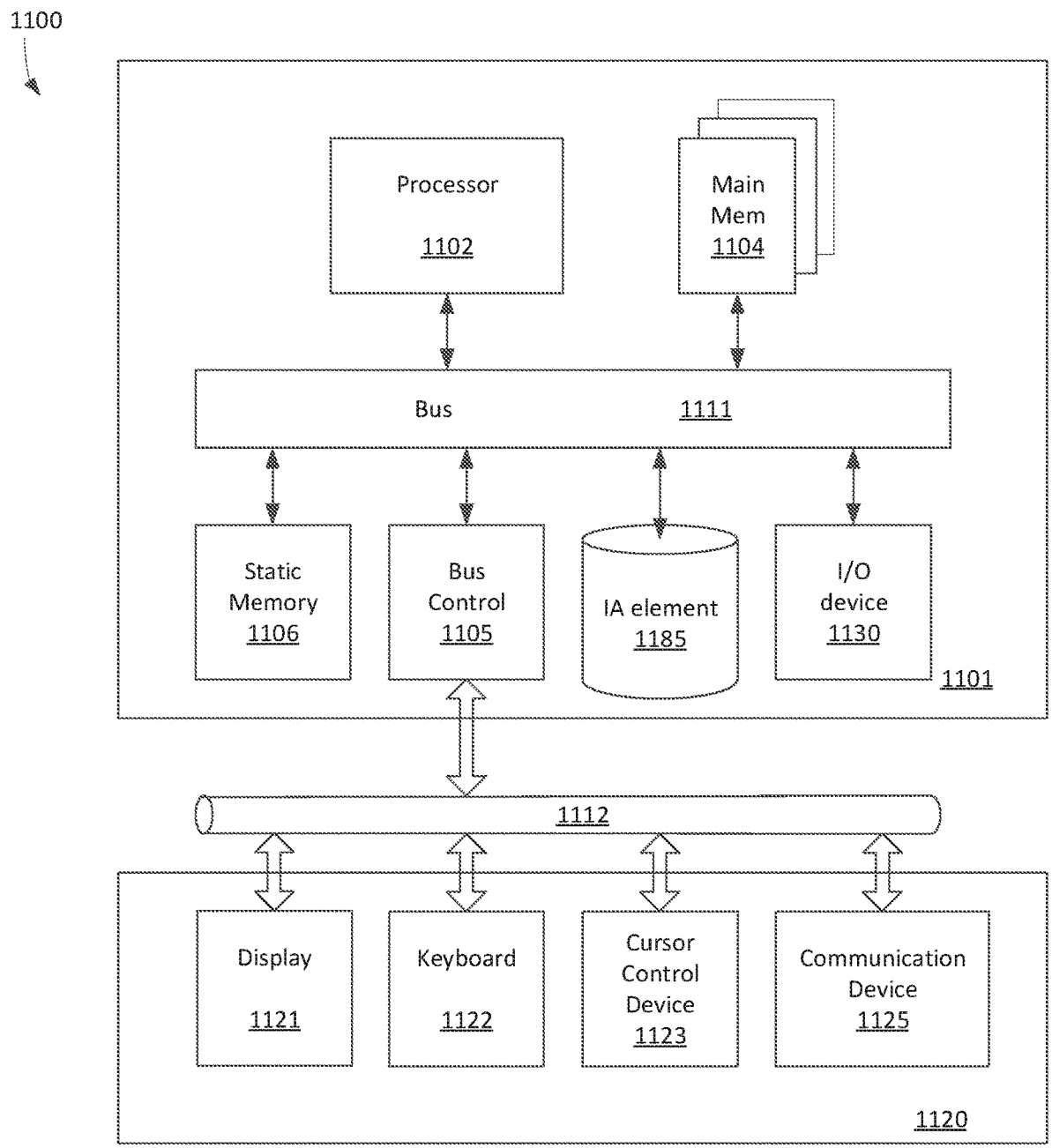
FIG. 11 is a block diagram illustrating a processing device, VOD system, VOC, subsystem, and/or computer system which can be installed in a vehicle for facilitating the virtuous cycle in accordance with one embodiment.

FIG. 11 is a block diagram 1100 illustrating a processing device, VOD system, VOC, subsystem, and/or computer system(s) which can be installed in a vehicle to support onboard cameras, CAN (Controller Area Network) bus, Inertial Measurement Units, Lidar, et cetera for facilitating virtuous cycle in accordance with one embodiment. Computer system or VOD system 1100 can include a processing unit 1101, an interface bus 1112, and an input/output ("IO") unit 1120. Processing unit 1101 includes a processor 1102, a main memory 1104, a system bus 1111, a static memory device 1106, a bus control unit 1105, I/O element 1130, and IA element 1185. It should be noted that the underlying concept of the exemplary embodiment(s) would not change if one or more blocks (circuit or elements) were added to or removed from FIG. 11.

Bus 1111 is used to transmit information between various components and processor 1102 for data processing. Processor 1102 may be any of a wide variety of general-purpose processors, embedded processors, or microprocessors such as ARM® embedded processors, Intel® Core™ Duo, Core™ Quad, Xeon®, Pentium™ microprocessor, Motorola™ 68040, AMD® family processors, or Power PC™ microprocessor.

Main memory 1104, which may include multiple levels of cache memories, stores frequently used data and instructions. Main memory 1104 may be RAM (random access memory), MRAM (magnetic RAM), or flash memory. Static memory 1106 may be a ROM (read-only memory), which is coupled to bus 1111, for storing static information and/or instructions. Bus control unit 1105 is coupled to buses 1111-1112 and controls which component, such as main memory 1104 or processor 1102, can use the bus. Bus control unit 1105 manages the communications between bus 1111 and bus 1112.

I/O unit 1120, in one embodiment, includes a display 1121, keyboard 1122, cursor control device 1123, and communication device 1125. Display device 1121 may be a liquid crystal device, cathode ray tube ("CRT"), touch-screen display, or other suitable display device. Display 1121 projects or displays images of a graphical planning board. Keyboard 1122 may be a conventional alphanumeric input device for communicating information between computer system 1100 and computer operator(s). Another type of user input device is cursor control device 1123, such as a conventional mouse, touch mouse, trackball, or other type of cursor for communicating information between system 1100 and user(s).

IA element 1185, in one embodiment, is coupled to bus 1111, and configured to interface with the virtuous cycle for facilitating IA detection(s). For example, if system 1100 is installed in a car, IA element 1185 is used to operate the IA model as well as interface with the cloud-based network. If system 1100 is placed at the cloud-based network, IA element 1185 can be configured to handle the correlating process for generating labeled data.

Communication device 1125 is coupled to bus 1111 for accessing information from remote computers or servers, such as server 104 or other computers, through wide-area network 102. Communication device 1125 may include a modem or a network interface device, or other similar devices that facilitate communication between computer 1100 and the network. Computer system 1100 may be coupled to a number of servers via a network infrastructure such as the Internet.

The exemplary embodiment includes various processing steps, which will be described below. The steps of the embodiment may be embodied in machine or computer executable instructions. The instructions can be used to cause a general purpose or special purpose system, which is programmed with the instructions, to perform the steps of the exemplary embodiment. Alternatively, the steps of the exemplary embodiment may be performed by specific hardware components that contain hard-wired logic for performing the steps, or by any combination of programmed computer components and custom hardware components.

Figure 12:
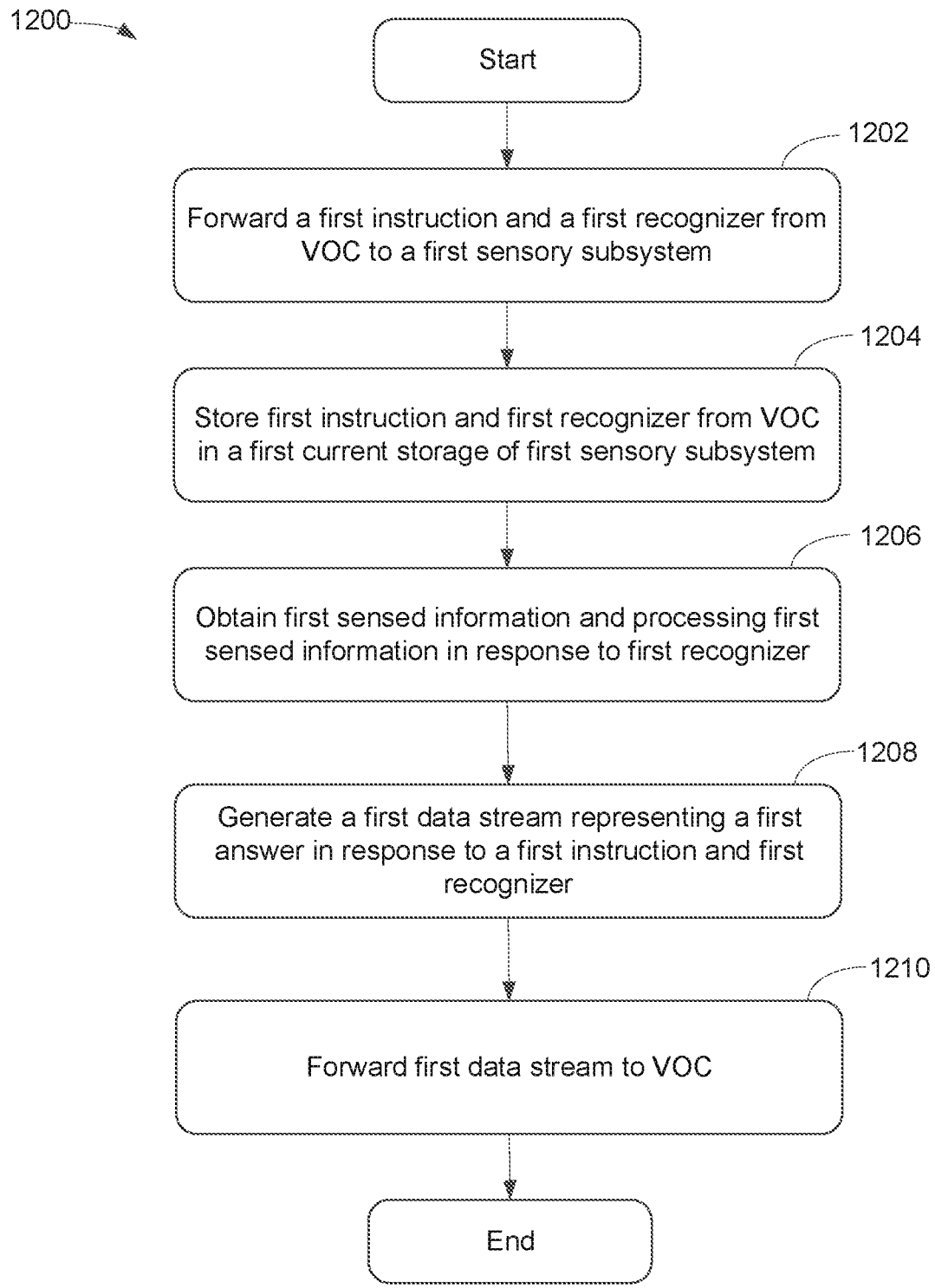
FIG. 12 is a flowchart illustrating a process of a VOD system providing local processing in accordance with one embodiment.

FIG. 12 is a flowchart 1200 illustrating a process of VOD system for providing local processing in accordance with one embodiment. At block 1202, the method or process capable of reducing or minimizing network uploading or data transmission between subsystems as well as with the cloud system(s) forwards an instruction and a recognizer from the VOC to a sensory subsystem in accordance with an inquiry stored in the VOC or local memory. For example, a visual instruction or visual inquiry is transmitted to a video subsystem for searching for and identifying a certain recognizer, like a symbol associated with a commercial establishment or some physical infrastructure, like a traffic light, through observed or captured video images taken by at least one camera. Also, an audio instruction or inquiry can be transmitted from the VOC to an audio subsystem for monitoring sound using observed or detected audio data from at least one microphone and/or listening sensor(s). In another example, a radar instruction or inquiry can be transmitted to a radar subsystem for monitoring the surrounding environment in which the vehicle is operating. A recognizer can be any representation of a real-world object that can be detected in data captured or generated by one or more sensors. In addition to visual representations of commercial establishments or traffic lights, other examples of recognizers include representations of certain sounds, like those emitted by emergency sirens, horns, or reverse beepers. For example, the VOC sends an instruction with a recognizer to an exterior audio subsystem for obtaining siren. The instruction, in this case, is an inquiry to the exterior audio subsystem to listen for siren which is the recognizer.

After storing the instruction and recognizer in the current storage of the sensory subsystem at block 1204, a set of sensory elements at block 1206 is activated based on the instruction and recognizer. Upon obtaining sensed information by the sensory elements at block 1208, the sensed information at block 1210 is processed in response to the recognizer. Once a data stream representing an answer in response to the instruction is generated, the process forwards the data stream to the VOC. In one embodiment, upon receiving the request, query, or inquiry from a cloud system via a wireless communication network, the instruction and the recognizer are generated in response to the request. In addition, the process can generate a data stream representing a result to the request in response to the data stream and uploading the data stream from the VOC to the cloud system via a wireless communication network.

The process, in one aspect, is also configured to forward a second instruction and a second recognizer from the VOC to a second sensory subsystem in accordance with the inquiry stored in the VOC memory. After storing the second instruction and second recognizer from the VOC in a second current storage of the second sensory subsystem, a set of second sensory elements are activated based on the second instruction and second recognizer. Upon obtaining second sensed information by the set of second sensory elements, the second sensed information is processed in response to the second recognizer. After generating a second data stream representing a second answer in response to the second instruction and the second recognizer, the second data stream is forwarded to the VOC.

Figure 13:
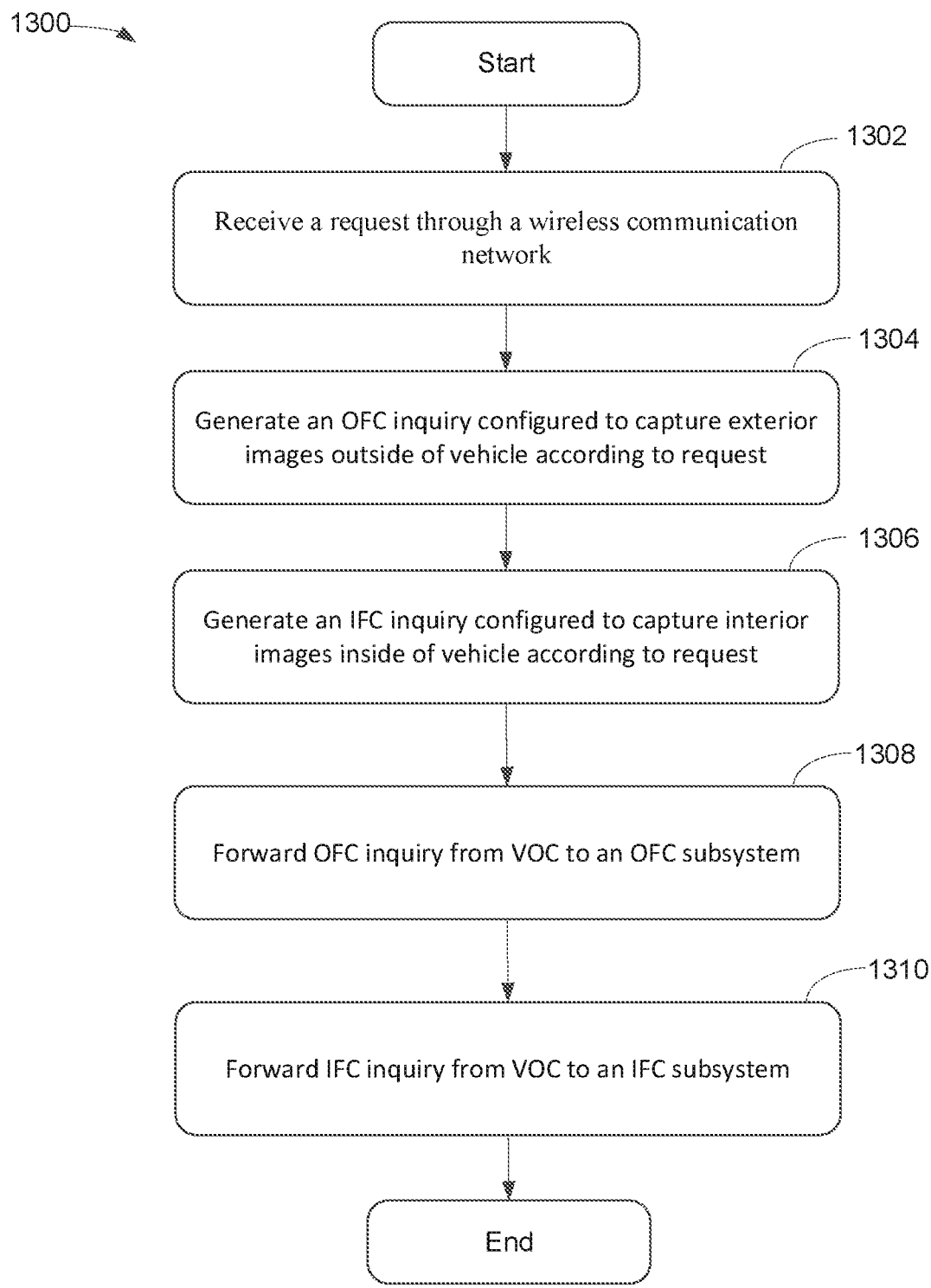
FIG. 13 is a flowchart illustrating a process of a VOD system generating various instructions or inquiries used for facilitating local processing in accordance with one embodiment.

FIG. 13 is a flowchart 1300 illustrating a process of VOD system for generating various instructions or inquiries used for facilitating local processing in accordance with one embodiment. At block 1302, a process or method of a multitier distributed system for minimizing data uploading receives a request by the VOC in the vehicle through a wireless communication network. Upon generating an OFC inquiry or query including recognizer(s) for capturing exterior images outside of the vehicle based on the request at block 1304, an IFC inquiry configured to capture interior images inside of the vehicle including the identity of operator at block 1306 is also generated. The OFC inquiry at block 1308 is forwarded from the VOC to an OFC subsystem. At block 1310, the IFC inquiry is forwarded from the VOC to an IFC subsystem.

The VOC, in one embodiment, is able to generate multiple subsystems' inquiries to fulfill the request from the cloud system. For example, if the request is to predict the driver who may want coffee soon, the VOC generates inquiry for the OFC subsystem to look for coffee shops while generating inquiry for the IFC subsystem to identify whether the driver is looking at the coffee shop(s) or not. Once a nearby coffee shop is discovered and the driver is looking at the shop, a prediction is generated and forwarded to the requester.

In one aspect, the process is further capable of receiving an OFC result formatted in a data stream sent from the OFC subsystem to the VOC in response to the OFC inquiry, and receiving an IFC result formatted in a data stream sent from the IFC subsystem to the VOC in response to the IFC inquiry. After generating a data stream representing a request result in response to the request based on the OFC result and the IFC result, the request result is forwarded from the VOC to the cloud system through the wireless communication network.

While particular embodiments have been shown and described, it will be obvious to those of ordinary skills in the art that based upon the teachings herein, changes and modifications may be made without departing from this exemplary embodiment(s) and its broader aspects. Therefore, the appended claims are intended to encompass within their scope all such changes and modifications as are within the true spirit and scope of this exemplary embodiment(s).

What is claimed is:

1. An automobile system configured to have a plurality of distributed subsystems able to provide network communication via a wireless network system, comprising:
an outward facing camera subsystem, having at least an outward facing camera, outward facing camera processor, and outward facing camera database, configured to recognize a predefined exterior object from a set of exterior images captured by the outward facing camera based on an exterior image query fetched from the outward facing camera database; and
a vehicle onboard computer coupled to the outward facing camera subsystem and having a vehicle onboard computer central processing unit, vehicle onboard computer database, and network manager, wherein the network manager includes an internal network circuit for communicating with the outward facing camera subsystem and an external network circuit for interfacing with a cloud system, the vehicle onboard computer configured to provide a data stream representing a recognized event in accordance with a query retrieved from the vehicle onboard computer database, wherein the vehicle onboard computer database includes a historical storage for storing historical records associated with the automobile, a current storage for storing substantially real-time data associated with the automobile, and a big data storage for storing data collected by other automobiles.

2. The automobile system of claim 1, further comprising an inward facing camera subsystem coupled to the vehicle onboard computer and that includes at least one inward facing camera, inward facing camera processor, and inward facing camera database, wherein the inward facing camera subsystem is configured to observe interior images inside a vehicle cabin of the automobile.

3. The automobile system of claim 2, wherein the inward facing camera subsystem is configured to recognize a predefined interior object from a set of interior images captured by the inward facing camera based on an interior image query.

4. The automobile system of claim 1, further comprising an exterior audio subsystem coupled to the vehicle onboard computer and that includes at least one exterior audio microphone, exterior audio processor, and exterior audio database, the exterior audio subsystem configured to capture exterior sound detected by the exterior audio microphone.

5. The automobile system of claim 4, wherein the exterior audio subsystem is configured to send a data stream summarizing captured audio sound to the vehicle onboard computer based on an exterior audio query.

6. The automobile system of claim 1, further comprising an interior audio subsystem coupled to the vehicle onboard computer and that includes at least one interior audio microphone, interior audio processor, and interior audio database, the interior audio subsystem configured to capture interior sound detected by the interior audio microphone.

7. The automobile system of claim 6, wherein the interior audio subsystem is configured to send a data stream summarizing captured interior audio sound to the vehicle onboard computer based on an interior audio query.

8. The automobile system of claim 1, wherein the outward facing camera database includes a historical storage for storing historical records associated with the outward facing camera subsystem, a current storage for storing substantially real-time data associated with the outward facing camera subsystem, and an outward facing camera big data storage for storing data collected by other subsystems.

9. The automobile system of claim 1, wherein the internal network circuit is configured to selectively signal at least a portion of a plurality of subsystems to locally generate predictive data representing an observed event based on a vehicle onboard computer query generated in response to a request from the cloud system.

10. An automobile system configured to have a plurality of distributed subsystems able to provide network communication via a wireless network system, comprising:
an outward facing camera subsystem, having at least an outward facing camera, outward facing camera processor, and outward facing camera database, configured to recognize a predefined exterior object from a set of exterior images captured by the outward facing camera based on an exterior image query fetched from the outward facing camera database, wherein the outward facing camera database includes a historical storage for storing historical records associated with the outward facing camera subsystem, a current storage for storing substantially real-time data associated with the outward facing camera subsystem, and an outward facing camera big data storage for storing data collected by other subsystems; and a vehicle onboard computer coupled to the outward facing camera subsystem and having a vehicle onboard computer central processing unit, vehicle onboard computer database, and network manager, wherein the network manager includes an internal network circuit for communicating with the outward facing camera subsystem and an external network circuit for interfacing with a cloud system, the vehicle onboard computer configured to provide a data stream representing a recognized event in accordance with a query retrieved from the vehicle onboard computer database.

11. The automobile system of claim 10, further comprising an inward facing camera subsystem coupled to the vehicle onboard computer and that includes at least one inward facing camera, inward facing camera processor, and inward facing camera database, wherein the inward facing camera subsystem is configured to observe interior images inside a vehicle cabin of the automobile.

12. The automobile system of claim 11, wherein the inward facing camera subsystem is configured to recognize a predefined interior object from a set of interior images captured by the inward facing camera based on an interior image query.

13. The automobile system of claim 10, further comprising an exterior audio subsystem coupled to the vehicle onboard computer and that includes at least one exterior audio microphone, exterior audio processor, and exterior audio database, the exterior audio subsystem configured to capture exterior sound detected by the exterior audio microphone.

14. The automobile system of claim 13, wherein the exterior audio subsystem is configured to send a data stream summarizing captured audio sound to the vehicle onboard computer based on an exterior audio query.

15. The automobile system of claim 10, further comprising an interior audio subsystem coupled to the vehicle onboard computer and that includes at least one interior audio microphone, interior audio processor, and interior audio database, the interior audio subsystem configured to capture interior sound detected by the interior audio microphone.

16. The automobile system of claim 15, wherein the interior audio subsystem is configured to send a data stream summarizing captured interior audio sound to the vehicle onboard computer based on an interior audio query.

17. The automobile system of claim 10, wherein the vehicle onboard computer database includes a historical storage for storing historical records associated with the automobile, a current storage for storing substantially real-time data associated with the automobile, and a big data storage for storing data collected by other automobiles.

18. The automobile system of claim 10, wherein the internal network circuit is configured to selectively signal at least a portion of a plurality of subsystems to locally generate predictive data representing an observed event based on a vehicle onboard computer query generated in response to a request from the cloud system.

* * * * *